(12) United States Patent
Tokoro et al.

(10) Patent No.: US 7,958,324 B2
(45) Date of Patent: Jun. 7, 2011

(54) COMPUTER SYSTEM AND COMMAND EXECUTION FREQUENCY CONTROL METHOD

(75) Inventors: Ken Tokoro, Odawara (JP); Takahiko Takeda, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 511 days.

(21) Appl. No.: 12/149,444

(22) Filed: May 1, 2008

(65) Prior Publication Data
US 2009/0240902 A1  Sep. 24, 2009

(30) Foreign Application Priority Data

Mar. 19, 2008 (JP) ................................. 2008-070794

(51) Int. Cl.
*G06F 12/00* (2006.01)
(52) U.S. Cl. ........ 711/158; 711/154; 711/167; 711/100; 711/E12.075

(58) Field of Classification Search .................. 711/100, 711/154, 158, 167, E12.075
See application file for complete search history.

(56) References Cited

U.S. PATENT DOCUMENTS

| 7,181,607 | B2 * | 2/2007 | Ido et al. ........................... 713/1 |
| 2006/0248237 | A1 | 11/2006 | Ido et al. |

* cited by examiner

*Primary Examiner* — Mardochee Chery
(74) *Attorney, Agent, or Firm* — Volpe and Koenig, P.C.

(57) ABSTRACT

A computer system of the present invention can adjust the execution frequencies of a command issued from a host and a command issued from a storage. An external manager disposed in the host configures a priority for a host command issued from a command issuing module inside the host. An internal manager disposed in the storage configures a priority for an internal command issued from a command issuing module inside the storage. The internal manager adjusts the execution frequency of the host command and the execution frequency of the internal command based on the host command priority and the internal command priority.

7 Claims, 22 Drawing Sheets

| TARGET VALUE MANAGEMENT TABLE | | |
|---|---|---|
| C120B | C121B | C122B |
| COMMAND | TARGET VALUE | MEASURED VALUE |
| H-CMD0 | IOPS(HS)0 | IOPS(HA)0 |
| H-CMD1 | | |
| H-CMD2 | | |
| ... | ... | ... |
| H-CMDn | IOPS(HS)n | IOPS(HA)n |
| I-CMD0 | IOPS(IS)0 | IOPS(IA)0 |
| I-CMD1 | | |
| I-CMD2 | | |
| ... | ... | ... |
| I-CMDn | IOPS(IS)n | IOPS(IA)n |

COMPUTER SYSTEM AND COMMAND EXECUTION FREQUENCY CONTROL METHOD

CROSS-REFERENCE TO RELATED APPLICATION

This application relates to and claims the benefit of priority from Japanese Patent Application No. 2008-070794, filed on Mar. 19, 2008, the entire disclosure of which is incorporated herein by reference.

BACKGROUND OF THE INVENTION

1. Field of the Invention

The present invention relates to a computer system and a method for controlling the frequency of command execution.

2. Description of the Related Art

For example, companies and the like manage data using storage controllers that have relatively large storage capacities for handling large amounts of various types of data. The storage controller, for example, comprises large numbers of storage devices, such as hard disk devices. The storage controller can provide RAID (Redundant Array of Inexpensive Disks)-based storage areas to a host computer (hereinafter, host). A logical volume is created by making use of the storage areas of storage devices. The host issues a read command or a write command by specifying a desired logical volume. Consequently, the host either reads out data from the desired logical volume or writes data to the desired logical volume.

The storage controller comprises a plurality of logical volumes, and can execute a different process for each logical volume. Therefore, for example, while copying data from a first logical volume to a second logical volume, the storage controller is able to simultaneously write write-data received from the host to a third logical volume.

Thus, there is the danger that the processing of a command issued from the host will be delayed due to the other processing being executed inside the storage controller, thereby lowering response performance. Although not directly related to this problem, as one known prior art, there is a system that classifies a plurality of communication ports of the storage controller as priority ports and non-priority ports, and processes a command that arrives at a priority port on a priority basis (JP-A-2002-108567).

In the above-mentioned prior art, a command received via a priority port is processed on a priority basis, thereby making it possible to improve response performance to the host that is using the priority port. However, the prior art is for carrying out I/O (Input/Output) control between the host and the storage controller, and is not for carrying out I/O control inside the storage controller or between storage controllers.

Therefore, since processing is either executed inside the storage controller or between a plurality of storage controllers, the processing of a command issued by the host may be delayed, and the response performance of the storage controller may be lowered.

SUMMARY OF THE INVENTION

The present invention was devised with the foregoing problems in view, and an object of the present invention is to provide a computer system and a command execution frequency control method that are capable of controlling the execution frequency of a command issued from a host computer and the execution frequency of a command issued inside a storage controller. Further objects of the present invention should become clear from the descriptions of the embodiments explained hereinbelow.

A computer system according to a first aspect of the present invention for solving the above-mentioned problems is a computer system having a host computer and a plurality of storage controllers used by the host computer, the computer system comprising: a first manager, disposed in the host computer, for associating a first priority with a first command issued from the host computer based on a first management table; and a second manager, disposed in at least any one prescribed storage controller of the plurality of storage controllers, for receiving both a second command issued from the prescribed storage controller and the first command issued from the host computer, the second manager (1) configuring a second priority for the second command based on a second management table, (2) respectively controlling the execution frequency of the first command and the execution frequency of the second command based on the first priority and the second priority, and (3) adjusting at least any one of the first priority and the second priority to make the execution frequency of a prescribed command of either the first command or the second command coincide with a preconfigured target value.

In a second aspect according to the first aspect, the first manager respectively configures the first management table and the second management table based on an indication from a user, and the second manager adjusts at least any one of the first priority and the second priority by respectively updating the contents of the first management table and the contents of the second management table based on the difference between the execution frequency and the target value of the prescribed command.

In a third aspect according to the first aspect or the second aspect, the second manager adjusts the value of the priority of any one of the first priority and the second priority so as to minimize the change in the execution frequency of the prescribed command.

In a fourth aspect according to any one of the first through the third aspects, the first manager can present the user with information related to the execution frequency of the prescribed command.

In a fifth aspect according to any one of the first through the fourth aspects, the first manager acquires information related to the execution frequency of the prescribed command from the second manager, and presents the acquired information to the user.

In a sixth aspect according to any one of the first through the fifth aspects, the first management table and the second management table respectively comprise a command priority management table in which priority values are respectively associated beforehand with each of the first command and the second command, and a priority invocation ratio management table in which an invocation ratio is associated beforehand with each of the priority values.

In a seventh aspect according to any one of the first through the sixth aspects, the second command is processed by a plurality of storage controllers comprising the prescribed storage controller.

A command execution frequency control method according to an eighth aspect is a command execution frequency control method for controlling the frequency at which a command issued from a host computer is executed inside a storage controller, and the frequency at which a command issued inside the storage controller is executed inside the storage controller, the control method comprising the steps of: associating a first priority with a first command issued from the host computer based on a first management table; associating a second priority with a second command issued from the storage controller based on a second management table; receiving both the first command for which the first priority is configured and the second command for which the second priority is configured; respectively controlling the first command execution frequency and the second command execution frequency based on the first priority and the second priority; and adjusting at least any one of the first priority and the second priority to make the execution frequency of the prescribed command of either the first command or the second command coincide with a preconfigured target value.

There are times when the means, functions and either one or all of the steps of the present invention can be configured as a computer program that is executed by the computer system. When either a part or the entire configuration of the present invention is configured from a computer program, this computer program, for example, can be affixed to and distributed via various types of storage media, or sent by way of a communication network.

BRIEF DESCRIPTION OF THE DRAWINGS

FIG. 18 is a schematic diagram showing a target value management table used by a computer system related to a third embodiment;

DESCRIPTION OF THE SPECIFIC EMBODIMENTS

Figure 1:
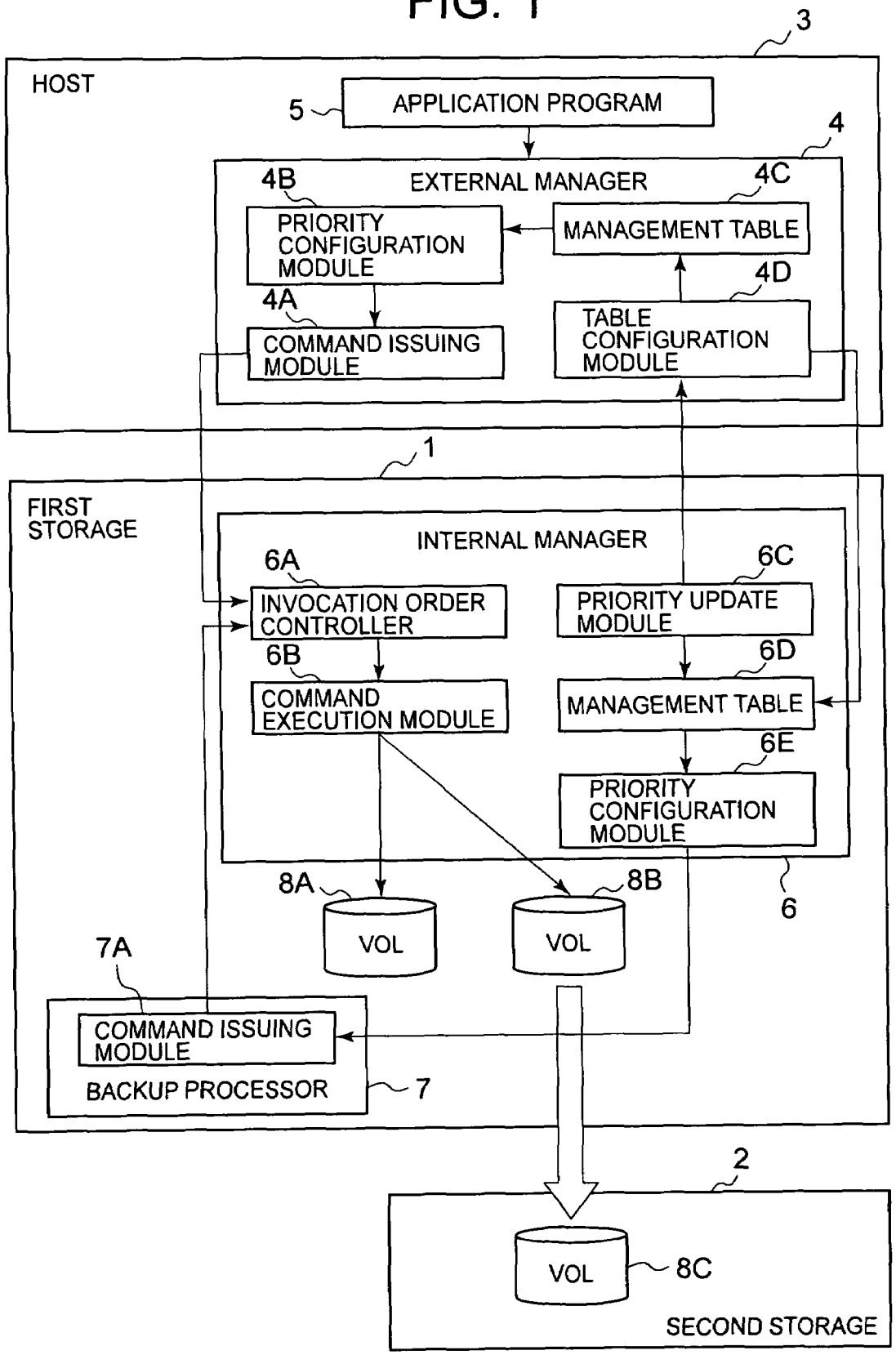
FIG. 1 is a conceptual view showing an embodiment of the present invention.

FIG. 1 is a schematic diagram showing an overview of the entire configuration of the embodiment of the present invention. The configuration shown in FIG. 1 presents an overview of the present invention to the extent necessary to understand and implement the present invention, but the scope of the present invention is not limited to the configuration shown in FIG. 1.

In this embodiment, as will be explained hereinbelow, the execution frequency of a command issued from a host 3 and the execution frequency of a command issued inside a storage 1 are adjusted by linkedly operating a manager (external manager 4) inside the host 3 and a manager (internal manager 6) inside the storage 1.

The computer system shown in FIG. 1, for example, comprises a plurality of storages 1, 2, and at least one host 3. Furthermore, instead of the configuration shown in the figure, for example, the computer system can also be configured from a plurality of hosts 3 and one storage, or the computer system can be configured from one host 3, one storage 1, and a plurality of storages 2.

The storages 1, 2 correspond to the "storage controller". Further, storage 1 corresponds to the "prescribed storage controller". Furthermore, an external manager 4, which is explained hereinbelow, corresponds to the "first manager", and the internal manager 6 corresponds to the "second manager".

First, the configuration of the host 3 will be explained. The host 3, for example, is configured as a computer device, such as a server computer, and comprises computer resources, such as a microprocessor and memory. The host 3, for example, comprises an external manager 4 and an application program 5. In addition, the host 3 comprises an operating system and a variety of drivers and other such computer programs.

In this embodiment, a first storage 1 will be considered the core of the computer system. Therefore, management functions provided outside the first storage 1 will be called the external manager 4, and management functions provided inside the first storage 1 will be called the internal manager 6.

The application program 5, for example, is a program for a variety of applications, such as a customer management program, electronic mail management program, sales management program, and text management program. A plurality of application programs 5 can be provided in the host 3, but for convenience of explanation, only one is shown. Furthermore, in the example of FIG. 1, it is supposed that the application program 5 utilizes a logical volume 8A inside the storage 1.

The external manager 4, for example, comprises a command issuing module 4A; priority configuration module 4B; management table 4C; and table configuration module 4D. The command issuing module 4A issues either one or a plurality of commands corresponding to a request from the application program 5.

For example, when the application program 5 requests a read-out of data from inside the logical volume 8A, the command issuing module 4A issues a read command to the logical volume 8A inside the storage 1. For example, when the application program 5 requests a data write to the logical volume 8A, the command issuing module 4A issues a write command to the logical volume 8A.

The priority configuration module 4B respectively configures priorities for the various commands issued from the command issuing module 4A. As the "first management table", the management table 4C, for example, can be configured comprising a plurality of tables.

For example, a priority is associated beforehand with each command type in the one table configuring the management table 4C. An invocation ratio is associated beforehand with each priority in the other table configuring the management table 4C. For example, the management table 4C is configured such that the higher the priority, the larger the invocation ratio becomes. That is, the invocation ratio of a command that should be given priority is configured high.

By referencing the management table 4C, which is configured like this, it is possible to detect the priority configured for each command, and to obtain the invocation ratio configured for a relevant priority. That is, the invocation ratio for each command is determined using the management table 4C.

Furthermore, similar to management table 4C, a table for managing the priority of each command, and a table for managing the invocation ratio for each priority are also provided in the management table 6D disposed in the internal manager 6 of the first storage 1. The respective priorities for all of the commands used in the computer system are configured in the respective management tables 4C, 6D.

The table configuration module 4D configures the respective management tables 4C, 6D based on an indication from the user. The user, for example, can manually input an invocation ratio for each priority to the external manager 4. The table configuration module 4D configures management table 4C, and also configures management table 6D in accordance with the user indication.

Further, the table configuration module 4D will reconfigure the contents of management table 4C based on a request from the internal manager 6. That is, as will be explained hereinbelow, when the internal manager 6 requests a change to the priority that has been configured for a prescribed command, the table configuration module 4D updates the contents of the management table 4C.

The storages 1, 2 will be explained. The storages 1, 2 and the host 3, for example, are connected via a communication network, such as a FC_SAN (Fibre Channel_Storage Area Network) or IP_SAN (Internet Protocol_SAN). Furthermore, an IP_SAN, for example, comprises an iSCSI (internet Small Computer System Interface) or FCoE (Fibre Channel over Ethernet (Ethernet is a registered trademark).

As the "storage controller", the storages 1, 2 comprise a controller, and a plurality of storage devices controlled by the controller. The functions provided by the controller, for example, are the internal manager 6 and a backup processor 7.

As the storage device, for example, a variety of devices capable of reading and writing data can be utilized, such as a hard disk device, semiconductor memory device, optical disk device, magneto-optical disk device, magnetic tape device, and flexible disk device. When a hard disk device is used as the storage device, for example, it is possible to utilize a FC (Fibre Channel) disk, SCSI (Small Computer System Interface) disk, SATA disk, ATA (AT Attachment) disk, or SAS (Serial Attached SCSI) disk.

When a semiconductor memory device is used as the storage device, for example, various memory devices can be used, such as a flash memory, FeRAM (Ferroelectric Random Access Memory), MRAM (Magnetoresistive Random Access Memory), Ovonic Unified Memory, or RRAM (Resistance RAM).

Logical volumes 8A, 8B are created on top of the physical storage areas of storage devices. The logical volumes 8A, 8B, for example, can be provided on redundant physical storage areas like RAID 5 or RAID 6. Furthermore, in the following explanation, "logical volume" may be abbreviated as "volume".

The internal manager 6, for example, comprises an invocation order controller 6A; a command execution module 6B; a priority update module 6C; the management table 6D; and a priority configuration module 6E. The invocation order controller 6A is for controlling the execution of respective commands based on an invocation ratio associated with each command. For example, when there is a command C1 with an invocation ratio of 60%, and commands C2, C3 with invocation ratios of 20% each, the invocation order controller 6A exercises control such that command C1 is executed at a frequency of six out of ten times, and the respective commands C2, C3 are each executed at a frequency of two out of ten times.

The command execution module 6B is a function for executing a command selected by the invocation order controller 6A. For convenience of explanation, only one is shown, but a command execution module 6B can be prepared for each command.

The priority configuration module 6E is a function for configuring a priority for a command issued on the inside of the storage 1. The priority configuration module 6E configures a prescribed priority for a command issued on the inside of the storage 1 based on management table 6D.

As described hereinabove, in this embodiment, two types of commands, a command issued from the host 3 and a command issued inside the storage 1, are executed. The command issued from the host 3 corresponds to the "first command", and the command issued inside the storage 1 corresponds to the "second command". In the explanation that follows, it has been decided that, to facilitate understanding, the command issued from the host 3 will be called the "host command", and the command issued inside the storage 1 will be called the "internal command".

In this embodiment, a command used by the backup processor 7 will be cited as an example of an internal command. In this embodiment, for example, the command for copying data between a logical volume 8B inside storage 1 and a logical volume 8C inside storage 2 is issued from a command issuing module 7A.

As explained hereinabove, a priority is respectively configured beforehand in the management table 6D for each command. Accordingly, the priority configuration module 6E configures a priority for an internal command that is issued from the command issuing module 7A by referencing the management table 6D.

The invocation order controller 6A controls the execution frequency (invocation order) of both the host command received from the host 3 and the internal command received from the backup processor 7 based on the host command priority (first priority) and the internal command priority (second priority).

The priority update module 6C, for example, adjusts either the priority configured for the host command or the priority configured for the internal command, or both, such that the execution frequency of the internal command coincides with a preconfigured target value.

For example, when the internal command execution frequency has not reached the target value, the priority update module 6C can either raise the priority of the internal command, or lower the priority of the host command. For example, when the internal command execution frequency exceeds the target value, the priority update module 6C can either lower the priority of the internal command, or can raise the priority of the host command.

Furthermore, the priority update module 6C can also adjust either the host command priority or the internal command priority, or both, such that the host command execution frequency coincides with the target value.

As will become clear from the embodiments explained hereinbelow, the priority update module 6C can change either the host command priority or the internal command priority, or both, such that the execution frequency of the control-targeted command does not change abruptly.

The first storage 1 comprises a plurality of logical volumes 8A, 8B. The one logical volume 8A is provided to the host 3. The application program 5 accesses the logical volume 8A, and carries out data reading and writing.

The other logical volume 8B creates a copy pair with the logical volume 8C inside the second storage 2. The backup processor 7, either regularly or irregularly, transfers the difference data between the storage contents of logical volume 8B and the storage content of logical volume 8C to logical volume 8C from logical volume 8B. Consequently, the storage contents of logical volume 8B coincide with the storage contents of logical volume 8C.

The configuration can be such that a process by which the host 3 accesses logical volume 8A and a copy process between the respective logical volumes 8B, 8C are completely unrelated, or the configuration can be such that the two processes are related.

For example, logical volume 8A can be used as the primary volume, logical volume 8B can be used as the secondary volume, and logical volume 8C can be used as the backup volume. The storage contents of logical volume 8A are also stored in logical volume 8B, which is the secondary volume. Furthermore, the storage contents of logical volume 8B are copied to logical volume 8C inside the second storage 2. Consequently, it is possible to provide a plurality of data backups, thereby enabling fault tolerance to be improved.

The computer system according to this embodiment operates as follows. When a host command is issued in accordance with a request from the application program 5, the priority configuration module 4B references the management table 4C and configures a priority for this host command. Priorities related to respective host commands and respective internal commands and the invocation ratio for each priority are managed in the management tables 4C, 6D. The command issuing module 4A sends the host command for which a priority has been configured to the first storage 1.

Inside the first storage 1, the backup processor 7 issues an internal command for a backup based on a backup schedule. The priority configuration module 6E configures a priority for this internal command by referencing the management table 6D. The command issuing module 7A sends the internal command for which a priority has been configured to the internal manager 6.

The invocation order controller 6A respectively receives the host command and the internal command, and stores same in a wait queue. The invocation order controller 6A fetches either the host command or the internal command from the wait queue at the prescribed frequency, and delivers same to the command execution module 6B. The result of command execution is sent to the source of the pertinent command.

The priority update module 6C monitors whether or not the execution frequency of the control-targeted command of either the host command or the internal command coincides with the target value. When the execution frequency of the control-targeted command does not coincide with the target value, or, when there has been an indication from the user, the priority update module 6C in either case changes either the host command priority or the internal command priority, or both. The contents of the respective management tables 4C, 6D are updated in accordance with a request from the priority update module 6C.

Configuring this embodiment like this makes it possible to automatically adjust the execution frequency of the host command and the execution frequency of the internal command by linkedly operating the external manager 4 and the internal manager 6. Therefore, it is possible to curb the lowering of host command-related response performance due to a process that is carried out in the background, such as a backup process, thereby making it possible to prevent a reduction in service quality and to improve usability. This embodiment will be explained in detail hereinbelow.

Embodiment 1

Figure 2:
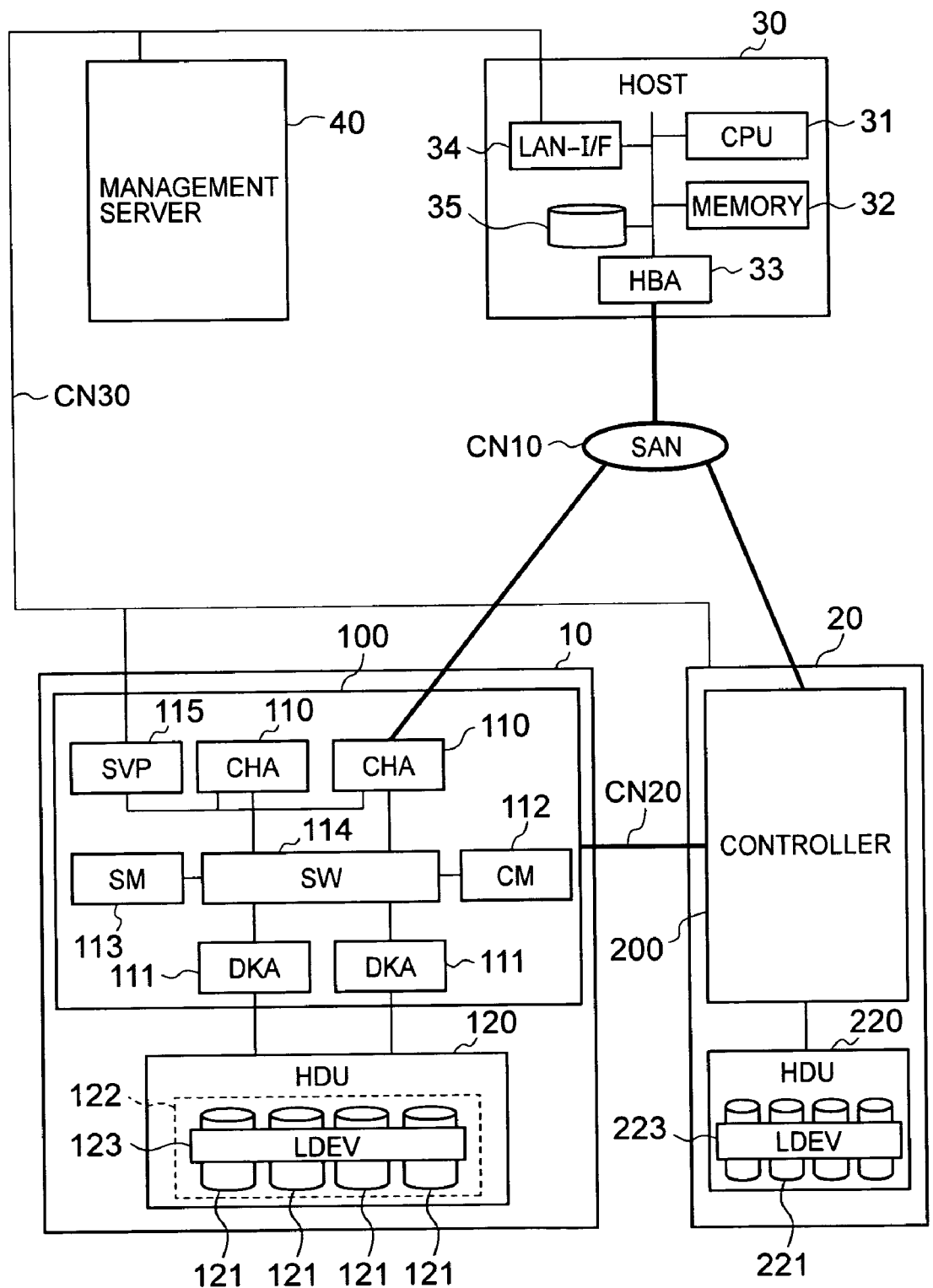
FIG. 2 is a block diagram showing the overall configuration of a computer system according to this embodiment.

FIG. 2 is a schematic diagram showing an overview of the entire computer system according to this embodiment. First, the corresponding relationship with FIG. 1 will be explained. A first storage 10 corresponds to the first storage 1 in FIG. 1, a second storage 20 corresponds to the second storage 2 in FIG. 1, and a host 30 corresponds to the host 3 in FIG. 1.

This computer system, for example, comprises a first storage 10; second storage 20; host 30; and management server 40. The respective storages 10, 20 and the host 30 are communicably interconnected via a first communication network CN10. The first storage 10 and the second storage 20 are communicably interconnected by way of a second communication network CN20. The first communication network CN10 and the second communication network CN20, for example, are configured as FC_SAN or IP_SAN. The management server 40 is communicably interconnected to the respective storages 10, 20 and the host 30 by way of a third communication network CN30. The third communication network CN30, for example, can be configured as a LAN (Local Area Network). Furthermore, the configuration can also be such that the respective storages 10, 20, the host 30 and the management server 40 are communicably interconnected only via the first communication network CN10.

The host 30, for example, comprises a microprocessor 31; a memory 32; an I/O communication interface 33; a management communication interface 34; and an auxiliary storage device 35.

The management server 40 is for managing the status of the computer system. The management server 40, for example, comprises a microprocessor, memory, communication interface, and so forth, and monitors the status of the respective storages 10, 20 and the host 30. As monitor-targeted information, for example, cache memory usage, volume usage, and I/O quantity can be cited.

The first storage 10, for example, comprises a controller 100; and a storage device mounting unit 120 (hereinafter, HDU 120). The controller 100 is for controlling the operation of the storage apparatus 10. The controller 100, for example, comprises a channel adapter 110 (hereinafter, CHA 110); disk adapter 111 (hereinafter, DKA 111); cache memory (CM in the figure) 112; shared memory (SM in the figure) 113; connection controller (SW in the figure) 114; and a service processor 115 (hereinafter, SVP 115).

The CHA 110 is for carrying out data communications with either the host 30 or the second storage 20. The CHA 110 comprises at least one or more communication ports. For example, a network address, such as an IP (Internet Protocol) address or a WWN (World Wide Name) is associated with a communication port.

The DKA 111 is for exchanging data with a disk drive 121 of the HDU 120. The DKA 111 is configured as a microcomputer system comprising a CPU and a memory the same as the CHA 110. The DKA 111, for example, writes data that the CHA 110 received from the host 30 to a prescribed disk drive 121. Further, the DKA 111 can also read out data from the prescribed disk drive 121, and send this data to either the host 30 or the second storage 20. When the DKA 111 carries out data input/output with a disk drive 121, the DKA 111 converts a logical address (LBA: Logical Block Address) to a physical address.

When a disk drive 121 is being managed according to RAID, the DKA 111 carries out data access in accordance with the RAID configuration. For example, the DKA 111 respectively write the same data to different disk drive groups (RAID groups) (RAID 1), or executes a parity computation, and writes data and parity to a disk drive group (RAID 5, RAID 6).

The cache memory 112 stores data received from either the host 30 or the second storage 20. Further, the cache memory 112 stores data read out from a disk drive 121.

The shared memory 113 stores various types of control information for use in the operation of the first storage 10. Further, in addition to a work area being configured in the shared memory 113, the shared memory 113 also stores various types of tables, which will be explained hereinbelow.

Furthermore, any one or a plurality of disk drives 121 can be used as a cache disk. Further, the cache memory 112 and the share memory 113 can be configured as respectively different memories, or one part of the storage area of the same memory can be used as the cache area, and the other part of the storage area can be used as the control area.

The connection controller 114 interconnects the respective CHA 110, the respective DKA 111, the cache memory 112 and the shared memory 113. The connection controller 114, for example, is configured as a crossbar switch.

The HDU 120 comprises a plurality of disk drives 121. As the disk drives 121, for example, various storage devices and the equivalent thereof, such as hard disk drives, flash memory devices, flexible disk drives, magnetic tape drives, semiconductor memory drives, and optical disk drives can be used.

For example, the physical storage areas of a plurality of disk drives 121 can be merged into a single area to configure a RAID group 122. At least one or more logical volumes 123 of either a fixed size or a variable size can be disposed in the physical storage area of this RAID group 122. Furthermore, either one or a plurality of logical volumes 123 can also be disposed in the physical storage area of a single disk drive 121. In the figures, a logical volume may be displayed as a "LDEV (Logical DEVice)".

The SVP 115 is connected to the respective CHA 110 by way of a LAN or other such internal network. The SVP 115 can carry out the exchange of data with the shared memory 113 and DKA 111 via the CHA 110. The SVP 115 collects various information inside the first storage 10, and provides this information to the management server 40.

The second storage 20 can be configured the same as the first storage 10. The second storage 20 comprises a controller 200; and HDU 220. The HDU 220 comprises a plurality of disk drives 221. A logical volume 223 is created using the physical storage area of the disk drives 221.

The first storage 10 and second storage 20 can be the same configuration or different configurations. For example, the first storage 10 and second storage 20 can be applied to the present invention even when these storages 10, 20 differ as to vendor, model, type or cache memory size.

Figure 3:
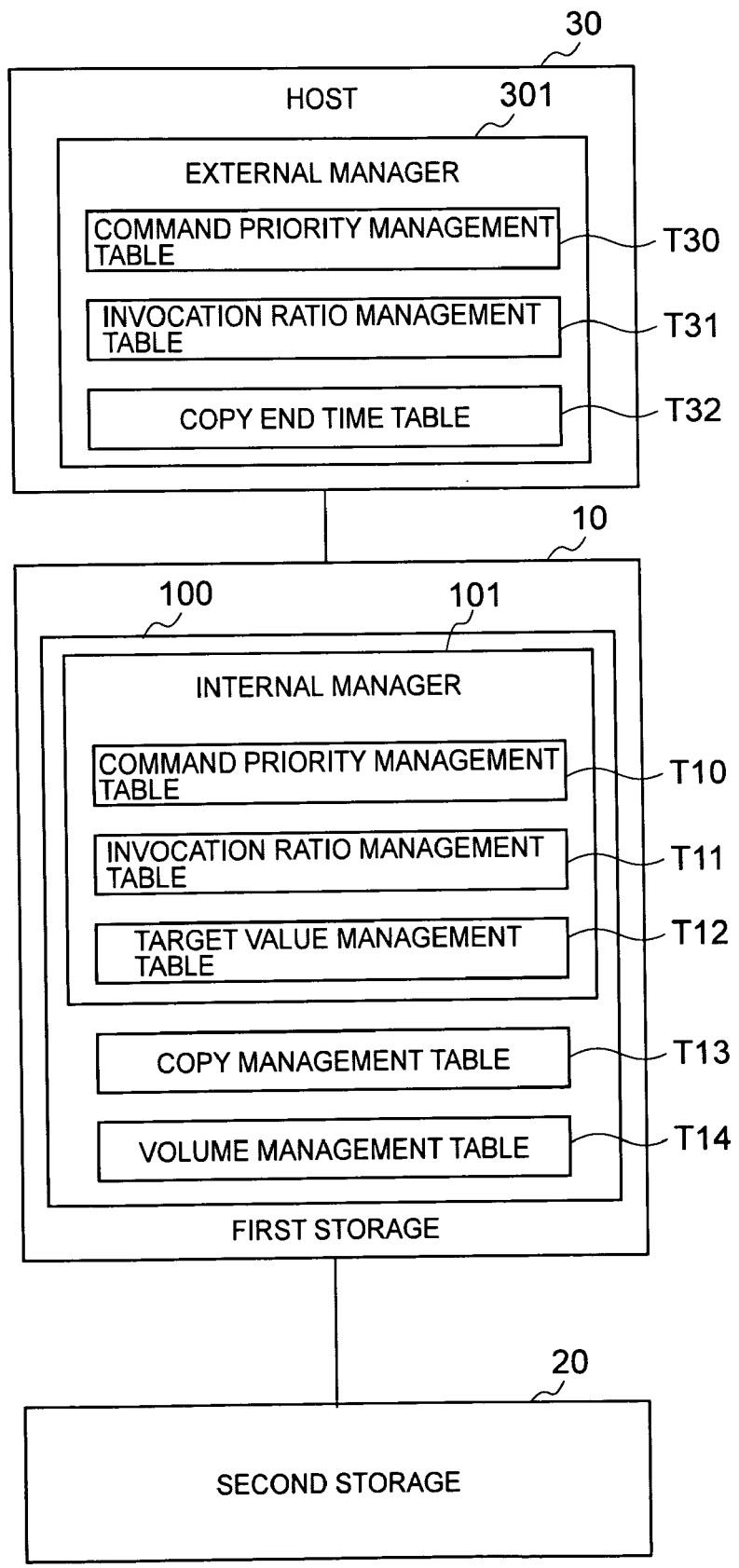
FIG. 3 is a schematic diagram showing the configuration of an external manager and an internal manager.

FIG. 3 is a schematic diagram showing the simplified configurations of an external manager 301 and an internal manager 101. As described hereinabove, since the storage apparatus is the core of the computer system in this embodiment, a management function located outside the storages 10, 20 will be called the external manager, and a management function inside the storage will be called the internal manager.

As the "first manager", the external manager 301, for example, comprises a command priority management table T30; an invocation ratio management table T31; and a copy end time table T32. These respective tables T30 through T32 correspond to the "first management table". The respective tables T30 through T32 will be explained in detail hereinbelow by referring to FIG. 5.

As the "second manager", the internal manager 101 is disposed inside the controller 100. The internal manager 101, for example, comprises a command priority management table T10; invocation ratio management table T11; and target value management table T12. The controller 100 comprises a copy management table T13; and a volume management table T14. The respective tables T10 through T14 will be explained in detail hereinbelow by referring to FIGS. 6 and 7.

FIG. 4 is a schematic diagram showing how a host command invocation ratio (execution frequency) and an internal command invocation ratio (execution frequency) are adjusted in stages. Here, host command signifies a command issued from the host 30. Internal command signifies a command issued inside the storage apparatus. The internal command, for example, is issued inside the first storage 10.

FIG. 4 will be explained using a remote copy as an example. A remote copy is a process for copying data from the one storage to the other storage. Consequently, it is possible to maintain the same data inside a plurality of physically separated storages.

A remote copy can be broadly divided into an initial copy and an update copy. An initial copy is a process for making the storage contents of a plurality of logical volumes that create a remote copy pair the same. That is, the initial copy is a process for transferring and storing all the block data stored in a copy-source volume to a copy-destination volume. An update copy is a process for writing the write-data created subsequent to the end of an initial copy to both the copy-source volume and the copy-destination volume.

Figure 4A:
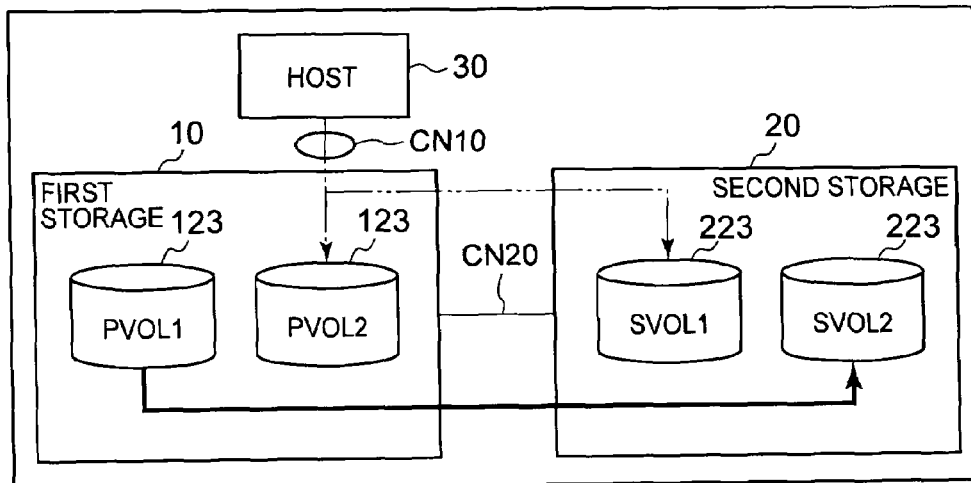
FIG. 4 is a schematic diagram showing how a plurality of command invocation ratios is adjusted.

In FIG. 4A, data is copied from a first volume 123 (PVOL1) inside the first storage 10 to a second volume 223 (SVOL2) inside the second storage 20. That is, volume 123 (PVOL1) is the copy-source volume, volume 223 (SVOL2) is the copy-destination volume, and an initial copy is executed from the copy-source volume (PVOL1) to the copy-destination volume (SVOL2).

Figure 4B:
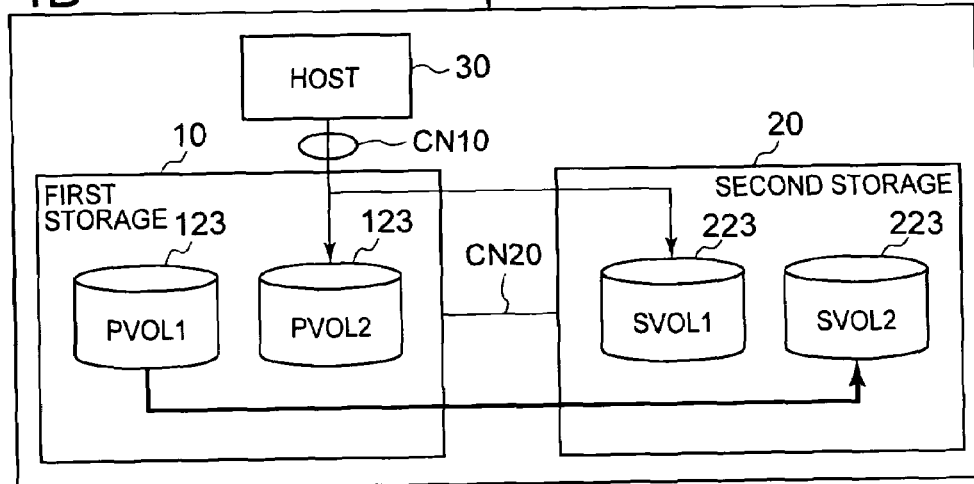

In FIG. 4B, in the midst of the initial copy, an update copy is executed for a different remote copy pair (PVOL2 and SVOL1). The update data sent from the host 30 is respectively written to a second volume (PVOL2) inside the first storage 10 and a first volume (SVOL1) inside the second storage 20. If the command related to the initial copy has a high priority, most of the various resources (cache memory capacity, communication bandwidth, and so forth) of the storages 10, 20 will be used for the initial copy. In this case, the amount of resources allocated to the update copy will be small, and response performance will drop.

Figure 4C:
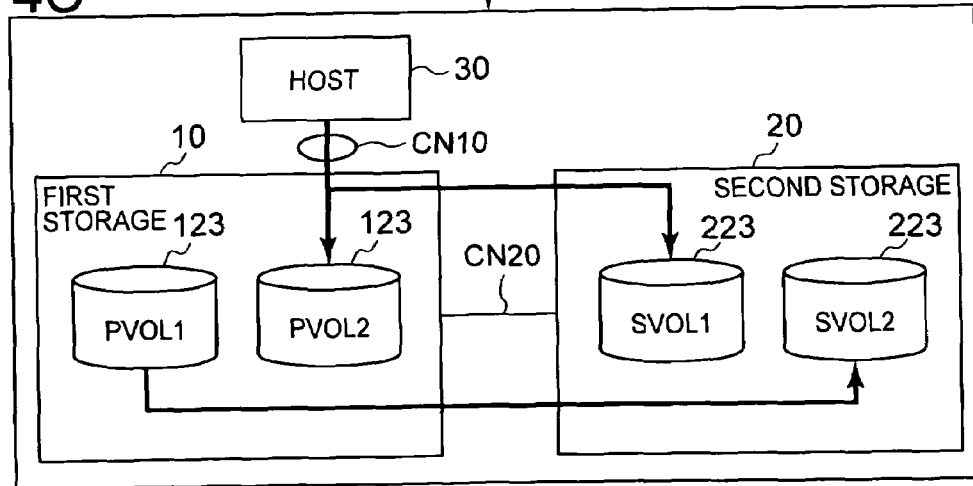

In FIG. 4C, the invocation ratio of the initial copy and the invocation ratio of the update copy are adjusted by either lowering the priority of the initial copy or raising the priority of the update copy.

Furthermore, in FIG. 4, an example is given of a case in which the update copy is executed in accordance with a host command and the initial copy is executed in accordance with an internal command. In contrast to this, the initial copy can be executed in accordance with a host command and the update copy can be executed in accordance with an internal command. Furthermore, this processing is not limited to a remote copy, and, for example, can also be applied to a data migration process. A data migration process, for example, is one in which the storage destination of data is changed in accordance with a fluctuation in the value of this data.

Figure 5:
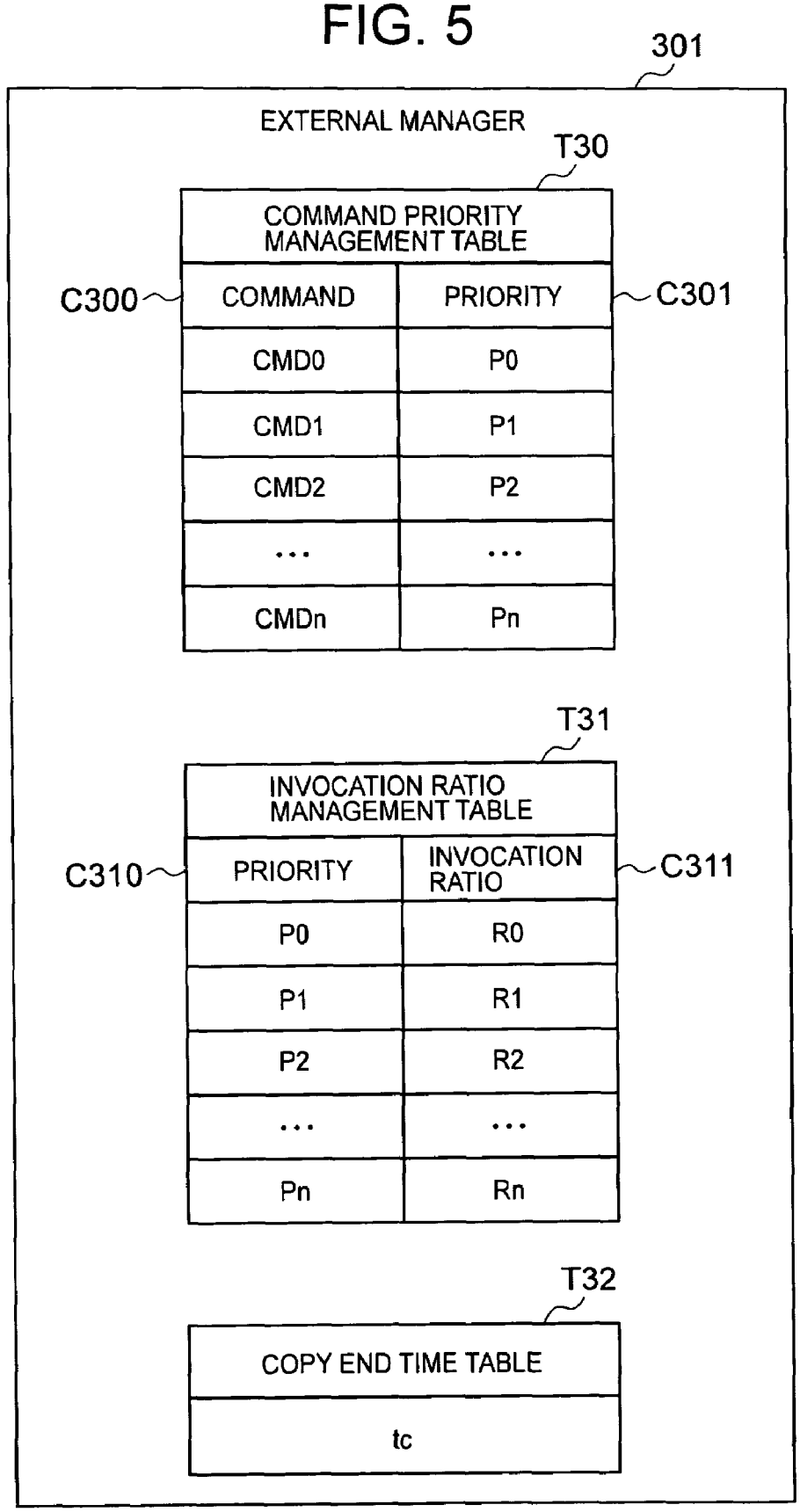
FIG. 5 is a schematic diagram showing the configuration of a table used by the external manager.

FIG. 5 is a schematic diagram showing examples of the configurations of the respective tables T30 through T32 used by the external manager 301.

The command priority management table T30 is for managing the priority separately associated with each command. The command priority management table T30, for example, comprises a command column C300 for identifying the respective commands; and a priority column C301 that shows the priority configured for the respective commands.

The command column C300 records both host commands and internal commands. The command column C300 can record beforehand all the host commands and all the internal commands used in the computer system. That is, the configuration can also be such that priorities are configured beforehand for all the commands used in the computer system. Instead of this, the configuration can also be such that the command column C300 only records a portion of the host commands and a portion of the internal commands beforehand. In this case, the configuration can be made such that a priority prepared beforehand is used as an initial value for a command that is not recorded in the command column C300.

In the priority column C301, for example, a priority is configured in 16 stages from P0 through P15. In this embodiment, the smaller the value of the priority the higher the priority at which a command is executed. Furthermore, a priority is not limited to 16 stages, and the configuration can also be such that a priority is configured either using less than 16 stages or using 17 or more stages.

The invocation ratio management table T31 is for managing the invocation ratio of each priority. This management table T31, for example, comprises a priority column C310 in which priorities are configured; and an invocation ratio column C311 in which invocation ratios are configured.

The copy end time table T32 manages the time tc required for a copy process. Because this is the time needed to complete a copy, it will also be called copy duration. A copy process, for example, can include an initial copy and a backup copy among others. The copy duration tc, for example, is configured by the user. For example, a user who wants a copy process to end within 8 hours of the start of the copy process configures 8 hours as the copy tc.

Figure 6:
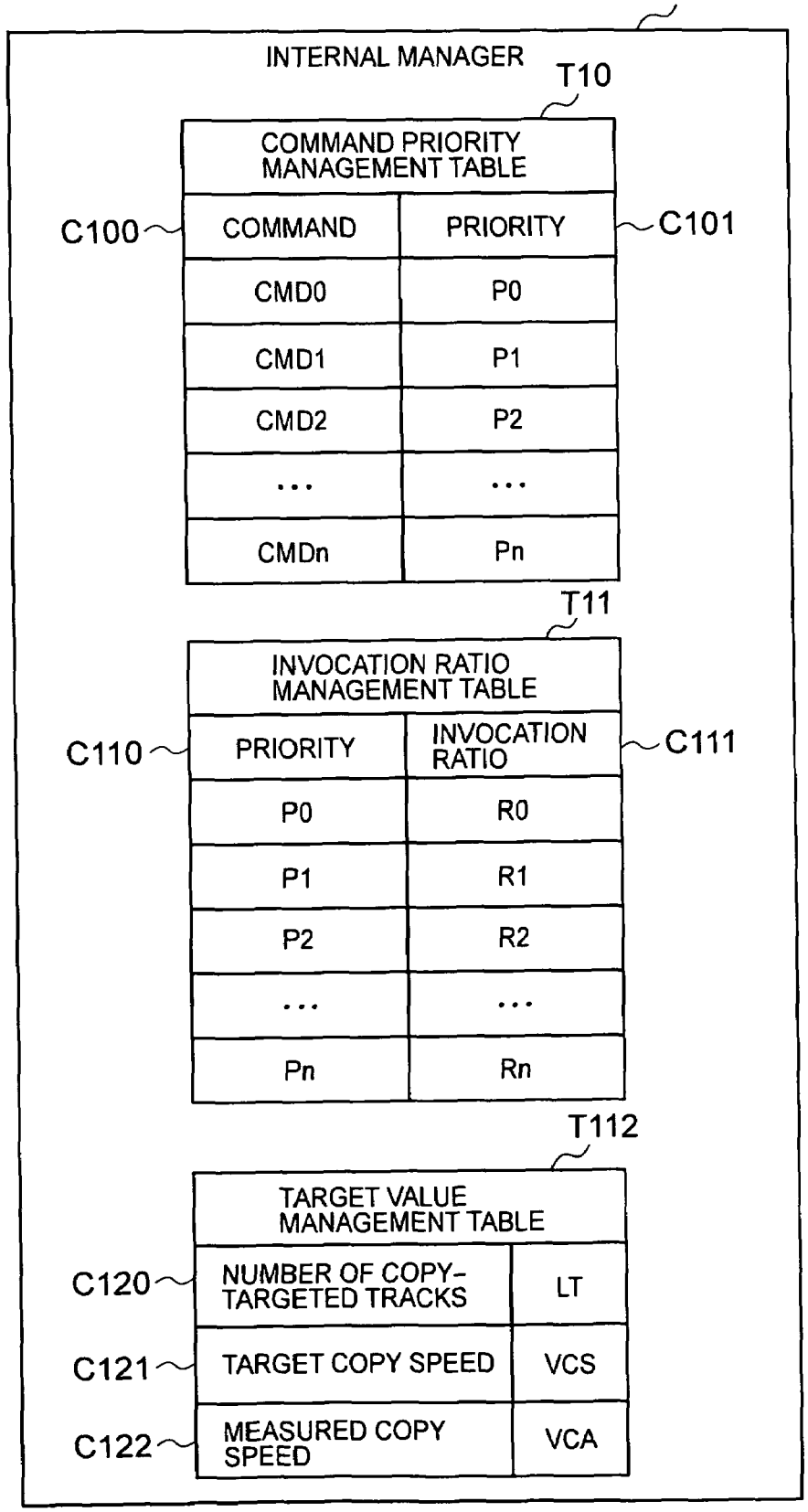
FIG. 6 is a schematic diagram showing the configuration of a table used by the internal manager.

FIG. 6 is a schematic diagram showing examples of the configurations of the respective tables T10 through T12 used by the internal manager 101. The command priority management table T10 comprises a command column C100 for identifying the respective commands, and a priority column C101 that shows the priorities of the respective commands, the same as command priority management table T30. This management table T10 has the same configuration as the management table T30 used by the external manager 301. That is, in this embodiment, management table T30 is created first, and the contents of management table T30 are sent from the external manager 301 to the internal manager 101. Consequently, the internal manager 101 creates management table T10 having the same contents as management table T30.

The invocation ratio management table T11 is for managing an invocation ratio for each priority. This management table T11 comprises a priority column C110 that shows the respective priorities; and an invocation ratio column C111 that shows the invocation ratio for each priority. Invocation ratio management table T11 shown in FIG. 6 is the same as management table T31 shown in FIG. 5.

The target value management table T12 is for managing a target value for a control-targeted process (a control-targeted command). In this embodiment, a case in which a copy command is targeted for control will be explained. The target value management table T12, for example, comprises a column C120 that shows the number of copy-targeted tracks LT; a column C121 that shows the target copy speed VCS; and a column C122 that shows the measured copy speed VCA. The target copy speed VCS can be determined by dividing the total number of copy-targeted tracks by the copy end time tc. As will be explained hereinbelow, the internal manager 101 uses the target value management table T12 to change the priority of a command.

Figure 7:
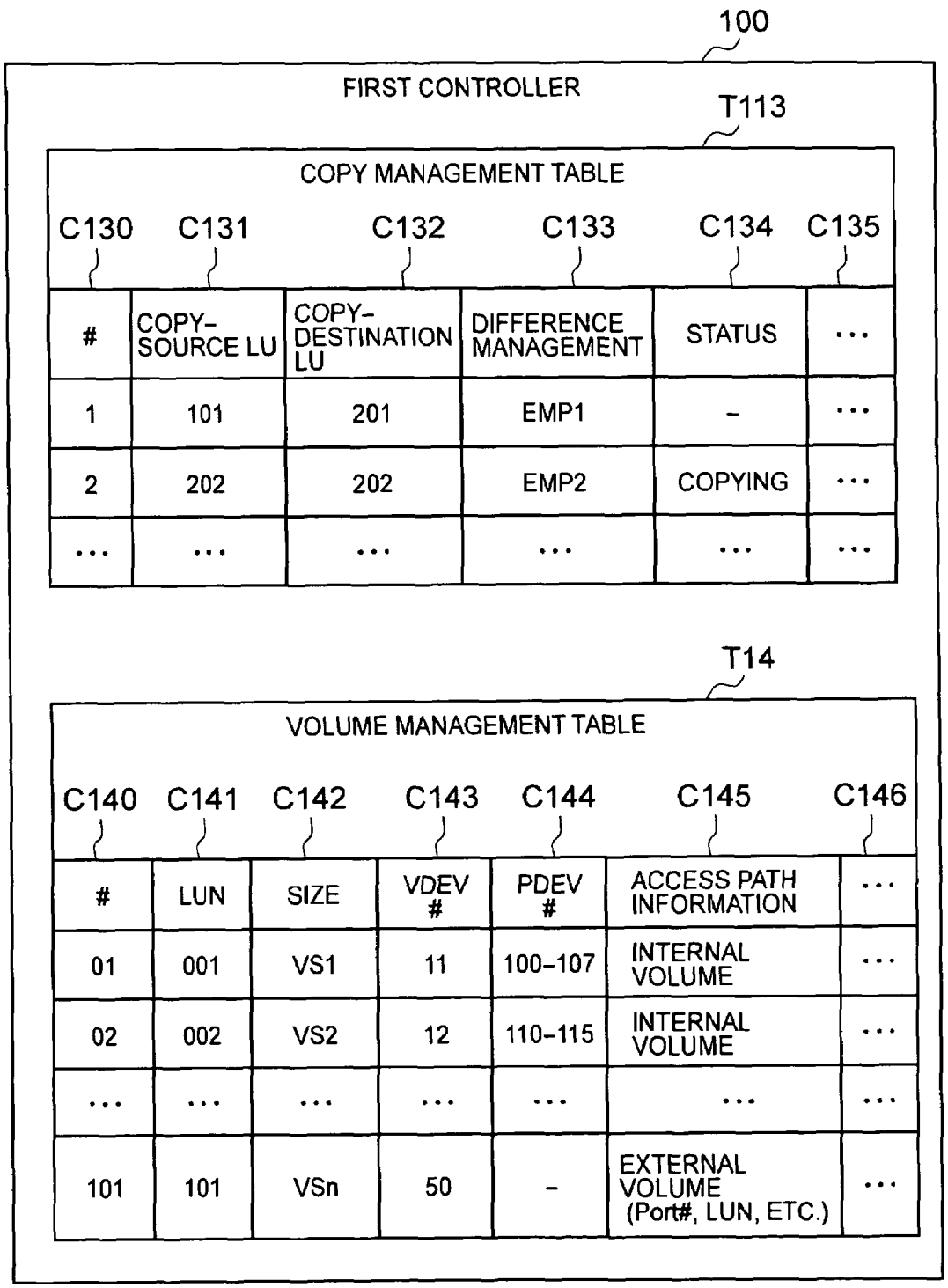
FIG. 7 is a schematic diagram showing the configuration of a table of a first controller.

FIG. 7 shows examples of the configurations of other management tables T13, T14, which are stored in the first controller 100 inside the first storage 10. The copy management table T13 is for managing a copy between logical volumes.

The copy management table T13, for example, can comprise a number column C130 for identifying respective copy pairs; a copy-source volume column C131 for identifying a copy-source volume; a copy-destination volume column C132 for identifying a copy-destination volume; a difference management column C133 for identifying information for managing a difference; a status column C134 for showing the status of a copy pair; and another column C135.

The difference management column C133 specifies information for managing difference data between a copy-source volume and a copy-destination volume. Information for managing difference data, for example, can include a difference bit map.

The other column C135, for example, can be for managing copy progress, copy start time, expected end time and so forth.

The volume management table T14 is for managing the logical volumes of the first storage 10 and the second storage 20. In this embodiment, a case in which the first storage 10 is treated as a typical storage, and also manages the logical volume 223 inside the second storage 20 together with its own logical volume 123 will be explained.

The volume management table T14, for example, comprises a number column C140; LUN column C141; size column C142; VDEV number column C143; PDEV number column C144; access path information column C145; and an other column C146.

The LUN column C141 manages the LUN (Logical Unit Number) associated with the respective logical volumes. The size column C142 manages the storage capacities of the respective logical volumes. The VDEV column C143 manages the intermediate storage devices (VDEV: Virtual DEVice) with which the respective logical volumes are associated. The PDEV column C144 manages the physical storage devices (PDEV: Physical DEVice) with which the respective logical volumes are associated. The access path information column C145 manages the path for accessing a logical volume.

The intermediate storage device corresponds to the RAID group 122 shown in FIG. 2. The physical storage device corresponds to the disk drive 121 shown in FIG. 2. The intermediate storage device 122 virtualizes the physical storage area of a physical storage device 121. A logical volume 123 is created using a portion of this virtualized physical storage area.

As will be explained hereinbelow, two types of intermediate storage devices 122 can be provided inside the first storage 10 here. One type of intermediate storage device 122 is directly associated with a disk drive 121 inside the first storage 10. A logical volume 123 created by using an intermediate storage device 122 that is directly associated with a disk drive 121 can be called an internal volume.

Figure 16:
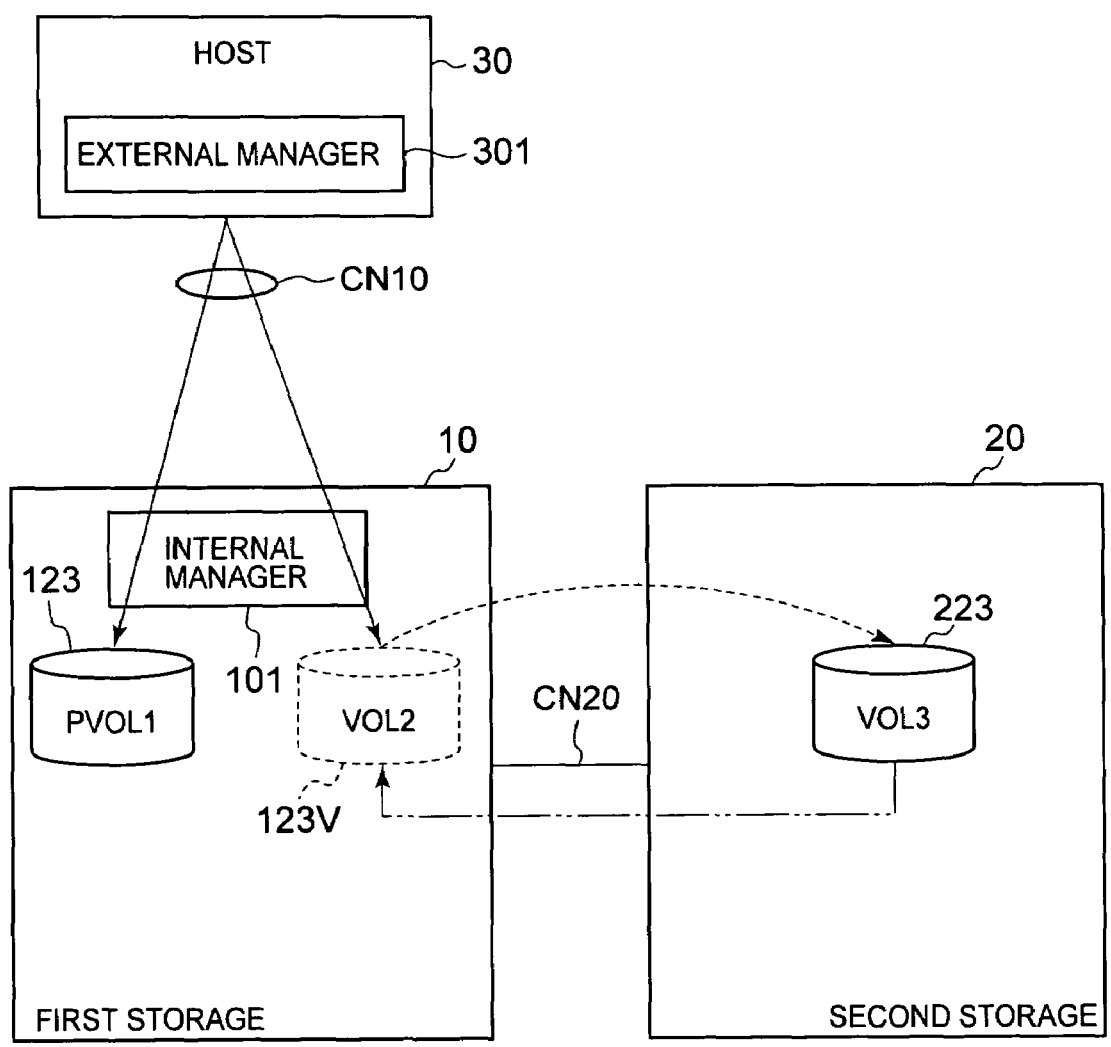
FIG. 16 is a schematic diagram showing an overview of a computer system related to a second embodiment.

The one other type of intermediate storage device 122 is associated with the logical volume 223 inside the second storage 20 as shown in FIG. 16, and is unrelated to a disk drive 121 inside the first storage 10. A logical volume 123V created using an intermediate storage device 122 that is associated with a logical volume 223 that exists outside the first storage 10 can be called an external volume.

The external volume 123V is associated with the logical volume 223 inside the second storage 20 via the intermediate storage device 122. The data inside the external volume 123V is actually stored in the disk drive 121 that configures the logical volume 223 associated with this external volume 123V.

A situation in which the first controller 100 of the first storage 10 receives from the host 30 a write command that has the external volume 123V as the write-destination will be explained. The first controller 100 references the volume management table T14, and changes the write-destination to the logical volume 223 inside the second storage 20. Then, the first controller 100 specifies the path for accessing this logical volume 223, and sends the write command and write-data to this logical volume 223. The second controller 200 of the second storage 20 stores the write-data received from the first controller 100 in the cache memory, and writes this write-data to the logical volume 223.

When the first controller 100 receives from the host 30 a read command that has the external volume 123V as the read-destination, the first controller 100 reads out the data from the logical volume 223 associated with the external volume 123V and sends this data to the host 30.

Thus, the first storage 10 can show the host 30 a storage resource (logical volume 223) of the second storage 20 just as if this resource were an internal volume of the first storage 10, and can use this resource just like it was an internal volume. The various functions that the first storage 10 provides to an internal volume 123 are similarly also provided to an external volume 123V.

Figure 8:
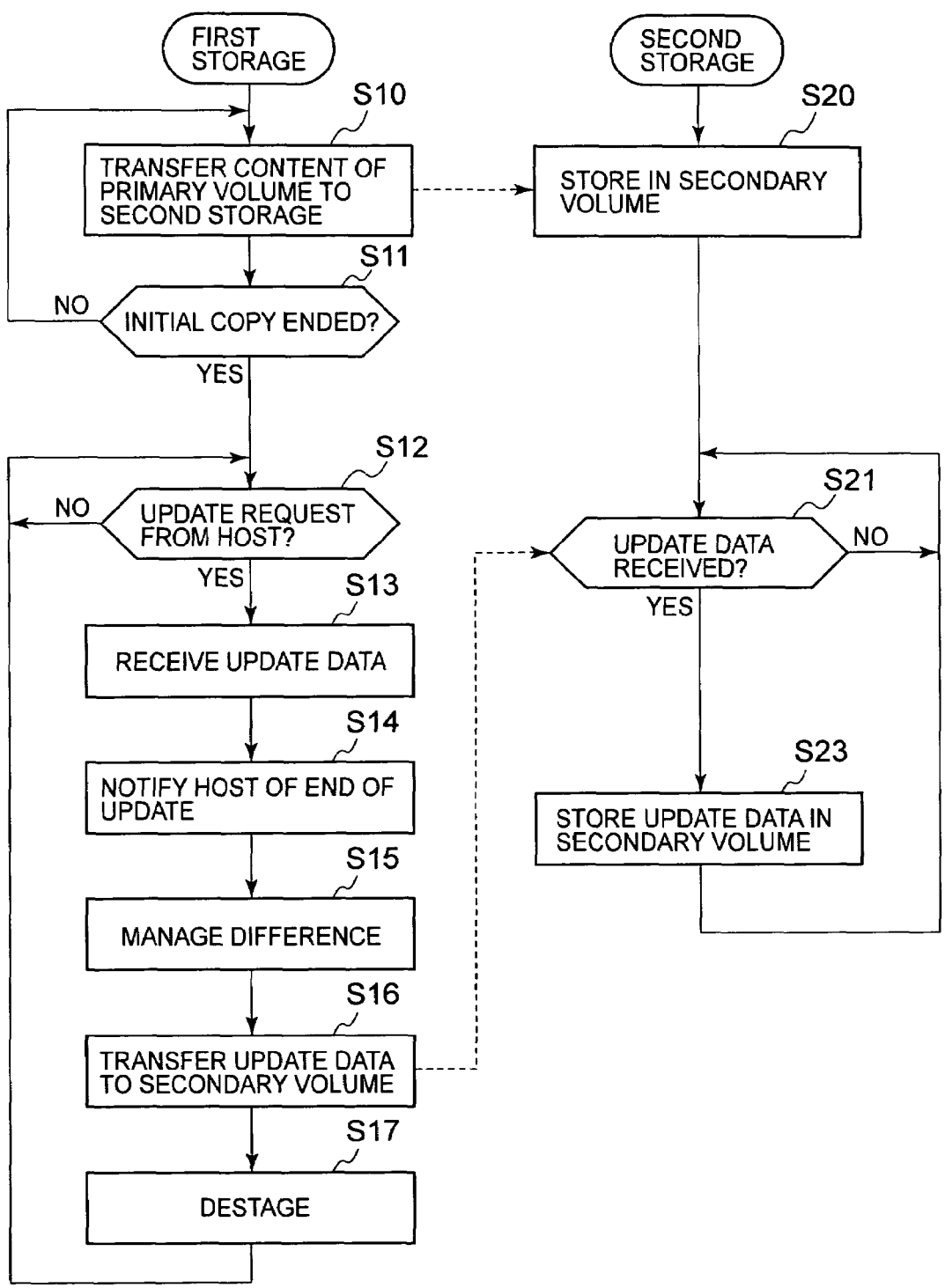
FIG. 8 is a flowchart showing a remote copy process.

FIG. 8 is a flowchart showing the operation of a remote copy process. It is supposed that the first storage 10 is the copy-source storage, and that the second storage 20 is the copy-destination storage. It is supposed that the logical volume 123 inside the first storage 10 is the primary volume (copy-source volume), and that the logical volume 223 inside the second storage 20 is the secondary volume (copy-destination volume). Furthermore, for convenience of explanation, it is supposed that the copy-source volume is an internal volume 123 of the first storage 10.

The respective flowcharts shown hereinbelow show overviews of the respective processes to the extent necessary to understand and implement the present invention, and may possibly differ from an actual computer program. Further, a so-called person having ordinary skill in the art should be able to easily change or delete a step shown in the figure, rearrange the order of the steps shown in the figure, and add a new step.

First of all, an initial copy is executed (S10, S11, S20). The first controller 100 of the first storage 10 transfers the storage content of the primary volume 123 to the second storage 20 (S10). The second controller 200 of the second storage 20 stores the data received from the first storage 10 in the secondary volume 223 (S20). S10 and S20 are executed repeatedly until all of the data stored in the primary volume 123 has been written to the secondary volume 223 (S11).

When the initial copy has ended (S11: YES), an update copy is executed in accordance with an update from the host 30 (S12: YES). The first controller 100 stores the data received from the host 30 in the cache memory 112 (S13), and thereafter reports to the host 30 that the update has ended (S14). That is, the end of processing is reported to the host 30 prior to storing the data in the disk drive 121 associated with the primary volume 123. The data write to the disk drive 121 is carried out at a different timing. Instead of an asynchronous process like this, the configuration can be such that the end of processing is reported to the host 30 subsequent to the data received from the host 30 having been written to the disk drive 121.

The first controller 100 carries out difference management for data that has been written to the primary volume 123 (S15). Difference management is a process for managing the location of difference data that occurs subsequent to the end of an initial copy.

The first controller 100 sends update data to the secondary volume 223 at a prescribed timing (S16). Upon receiving the update data (S21: YES), the second controller 200 stores the received update data in the secondary volume (S23).

The prescribed timing, for example, can include a case in which a prescribed amount or more of update data has been accumulated. Furthermore, the update data can be written to the secondary volume 223 at the same time as the update data write to the primary volume 123.

The first controller 100 carries out a destage process (S17). The destage process writes update data stored in the cache memory 112 to the disk drive 121 associated with the primary volume 123. Although not shown in the figure, the second controller 200 also carries out a destage process at an appropriate timing.

Thus, the remote copy process comprises an initial copy process and an update copy process. A plurality of remote copy pairs can be provided in the computer system, and the respective copy pairs can operate in parallel. Therefore, while a certain copy pair is implementing an initial copy, a different copy pair can be carrying out an update copy. When the initial copy between the certain copy pair is using most of the storage resources, the processing of the update copy related to the other copy pair can be delayed.

Figure 9:
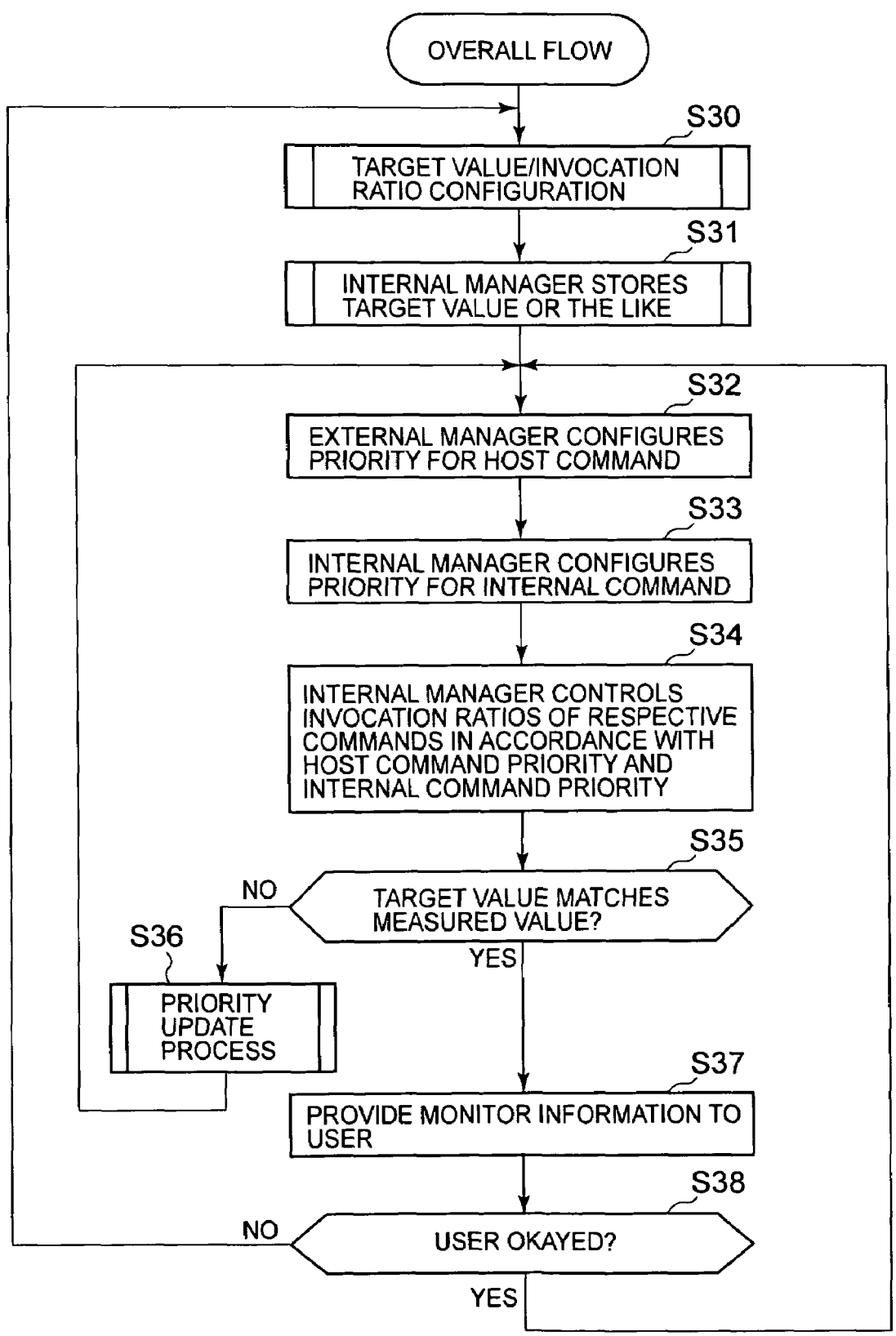
FIG. 9 is a flowchart showing the overall process for controlling the invocation ratio.

Accordingly, in this embodiment, the invocation ratio of the host command (for example, an update request or the like that triggers an update copy) and internal command (for example, an initial copy) are adjusted as shown in FIG. 9 and thereafter, thereby improving the response performance to the host 30.

FIG. 9 is a flowchart showing an overview of the entire flow of operations according to this embodiment. The processing shown in FIG. 9 can be divided into a preparation stage (S30 through S33) for configuring the respective configuration values; an execution stage (S34) for carrying out control based on the configured values; and a revision stage (S35 through S38) for revising a configuration value in accordance with the result of control execution.

The user respectively configures a target value and invocation ratio in the external manager 301 by way of a user interface such as a keyboard switch (S30). In this embodiment, the value of the copy end time tc shown in FIG. 5 is configured by the user as the basic data for calculating a target value. Next, the user configures an invocation ratio by priority (S30). The user can configure an invocation ratio for each priority. The time tc inputted by the user is registered in the table T32 (S30). Similarly, an invocation ratio inputted by the user is registered in the invocation ratio table T31 (S30).

The target value (copy end time tc) and invocation ratios configured in S30 are sent to internal manager 101 from the external manager 301. The internal manager 101 registers a received invocation ratio in the invocation ratio management table T11 (S31). Furthermore, the internal manager 101 creates a target value management table T12 for the copy end time tc as will be described in FIG. 11 (S31).

Furthermore, the configuration can also be such that the user can configure a priority for each command. In addition, the configuration of an invocation ratio by the user can be eliminated. For example, the configuration can be such that the priority-based invocation ratio can be a fixed value that is configured and changed automatically by an invocation ratio configuration program or the like.

When the host 30 issues a host command, the external manager 301 uses the command priority management table T30 to configure in the relevant host command a priority corresponding to this host command (S32).

When the first controller 100 of the first storage 10 issues an internal command, the internal manager 101 uses the command priority management table T10 to configure in the relevant internal command a priority corresponding to this internal command (S33).

The internal manager 101 respectively receives the host command and internal command, and controls the invocation ratios of the respective commands in accordance with the host command priority and the internal command priority (S34).

Figure 10:
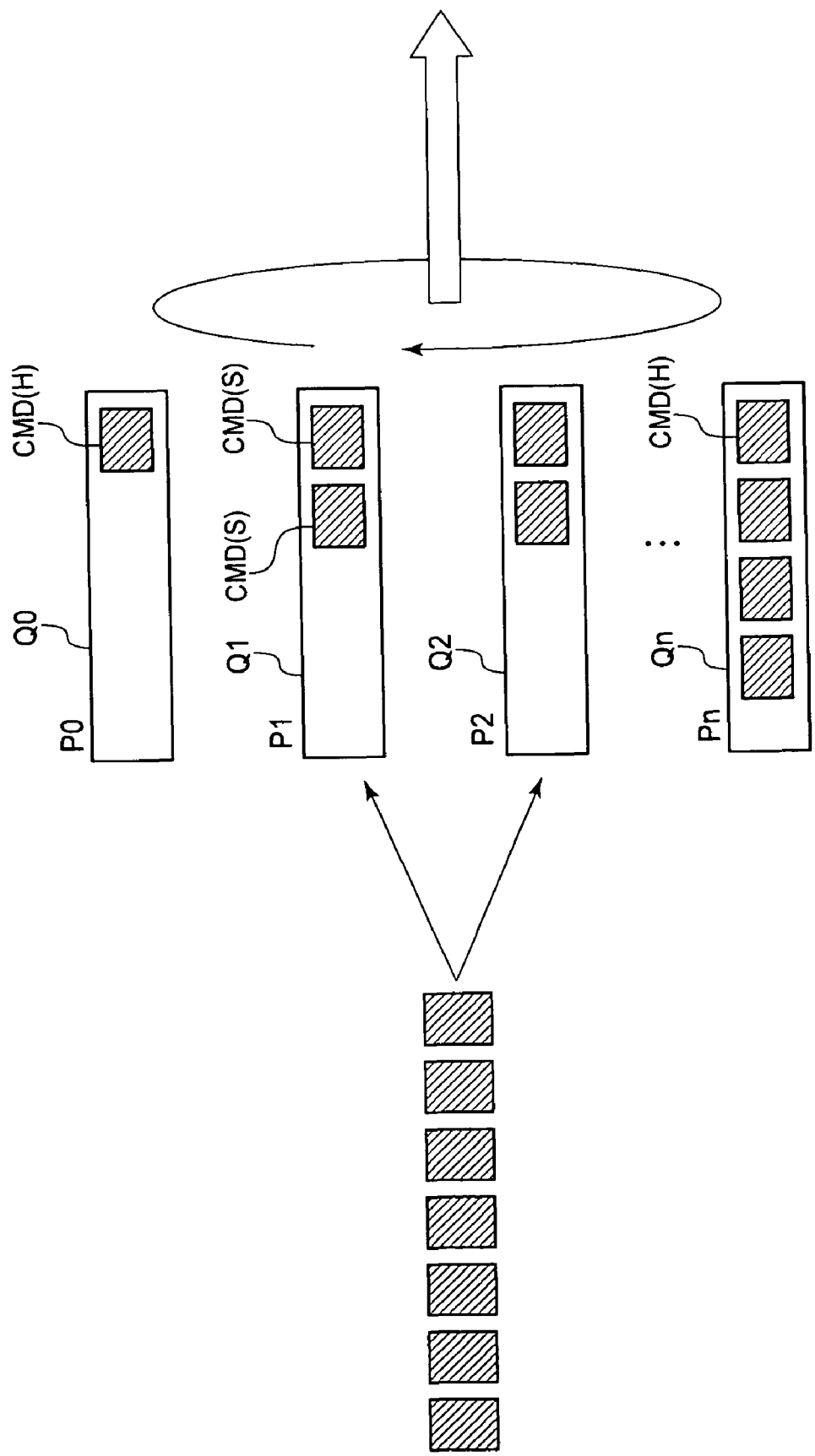
FIG. 10 is a schematic diagram showing how a command invocation is scheduled.

Refer to FIG. 10. FIG. 10 is a schematic diagram showing how to schedule the command execution order in accordance with the invocation ratio. The internal manager 101 provides a queue Q0 through Qn for each priority P0 through Pn. A command CMD received by the internal manager 101 is stored in the queue that corresponds to the configured priority. In FIG. 10, a host command is displayed as CMD(H), and an internal command is displayed as CMD(S).

The internal manager 101 searches the respective queues Q0 through Qn in order, and when a command CMD is stored in a queue, invokes this command by fetching the command from the queue. At this time, the internal manager 101 adjusts the number of commands invoked from the respective queues Q0 through Qn such that the respective priorities P0 through Pn constitute the invocation ratios R0 through Rn.

Return to FIG. 9. The internal manager 101 compares the target copy speed VCS, which is the target value, against the measured copy speed VCA, which is the measured value, and determines whether or not the two coincide. When the target value and the measured value do not match (S35: NO), a priority update process is executed (S36). In the priority update process, as will be described hereinbelow using FIG. 13, the internal manager 101 changes the priority associated with the command such that the target value and the measured value match, and, in addition, the change in the invocation ratio is as small as possible (S36).

When the target value and the measured value match (S35: YES), the external manager 301 provides the user with monitor information in accordance with the user's wishes (S37). Monitor information here is information related to the control of the command invocation ratio, and, for example, comprises the target value VCS and the measured value VCA.

The user determines whether or not to reconfigure the target value based on monitor information (S38). When the user is dissatisfied with the current target value and wishes to reconfigure this value (S38: NO), processing returns to S30. When the user is satisfied with the current target value (S38: YES), processing returns to S32. Furthermore, instead of a configuration in which the user determines the reconfiguration of the target value, the configuration can be such that the target value is controlled automatically based on a threshold prepared beforehand.

Figure 11:
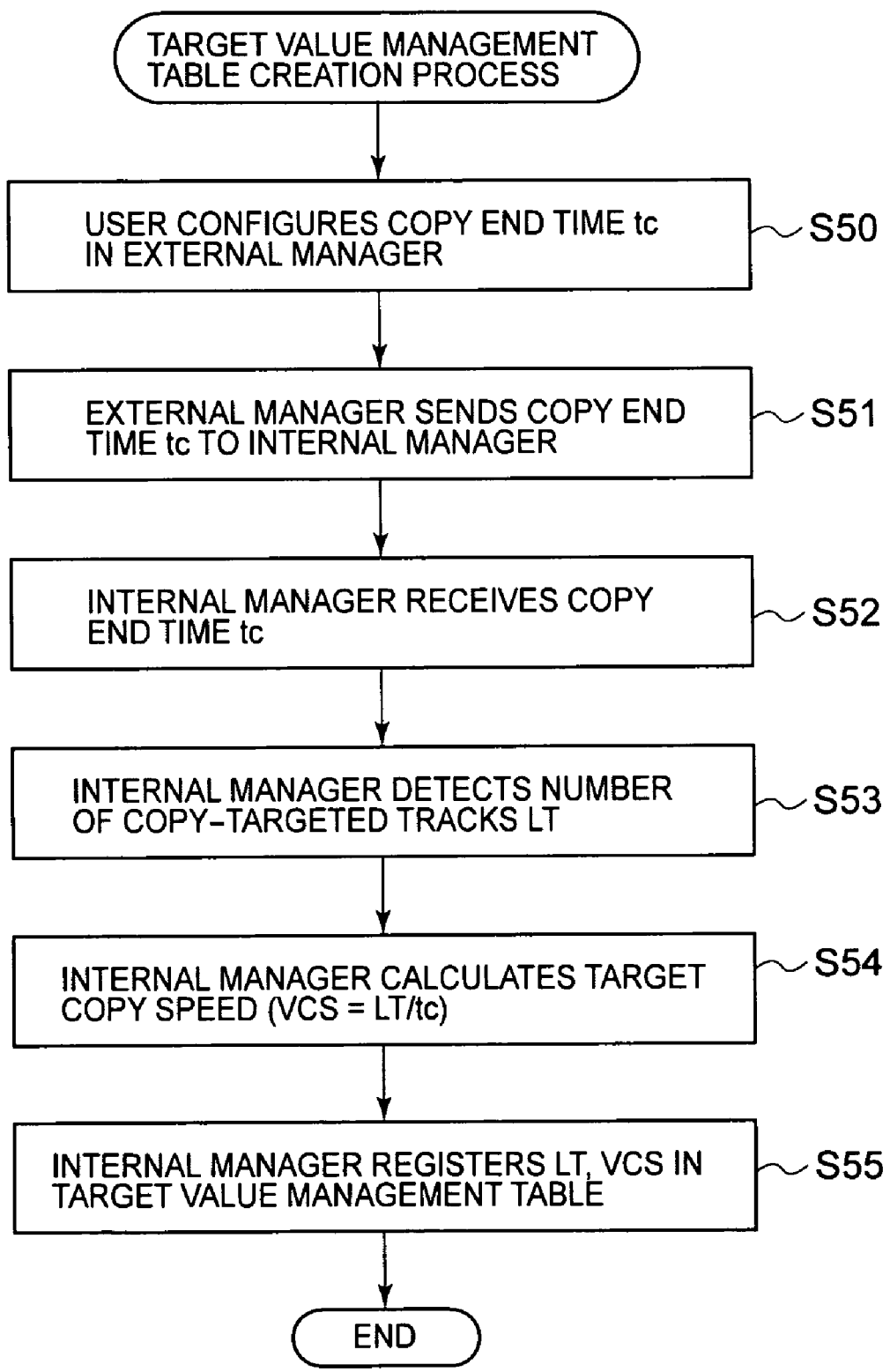
FIG. 11 is a flowchart of a target value configuration process.

FIG. 11 shows the process for creating a target value management table T12. This process is executed in S30 of FIG. 9. The user configures the copy end time tc in the external manager 301 (S50). The external manager 301 sends the copy end time tc to the internal manager 101 (S51).

Upon receiving the copy end time tc (S52), the internal manager 101, for example, detects the number of copy-targeted tracks LT by referencing the copy management table T13 (S53). The internal manager 101 calculates the target copy speed VCS by dividing the number of copy-targeted tracks by the copy end time tc (S54). The internal manager 101 registers the number of copy-targeted tracks LT detected in S53 and the target copy speed VCS calculated in S54 in the target value management table T12 (S55).

Figure 12:
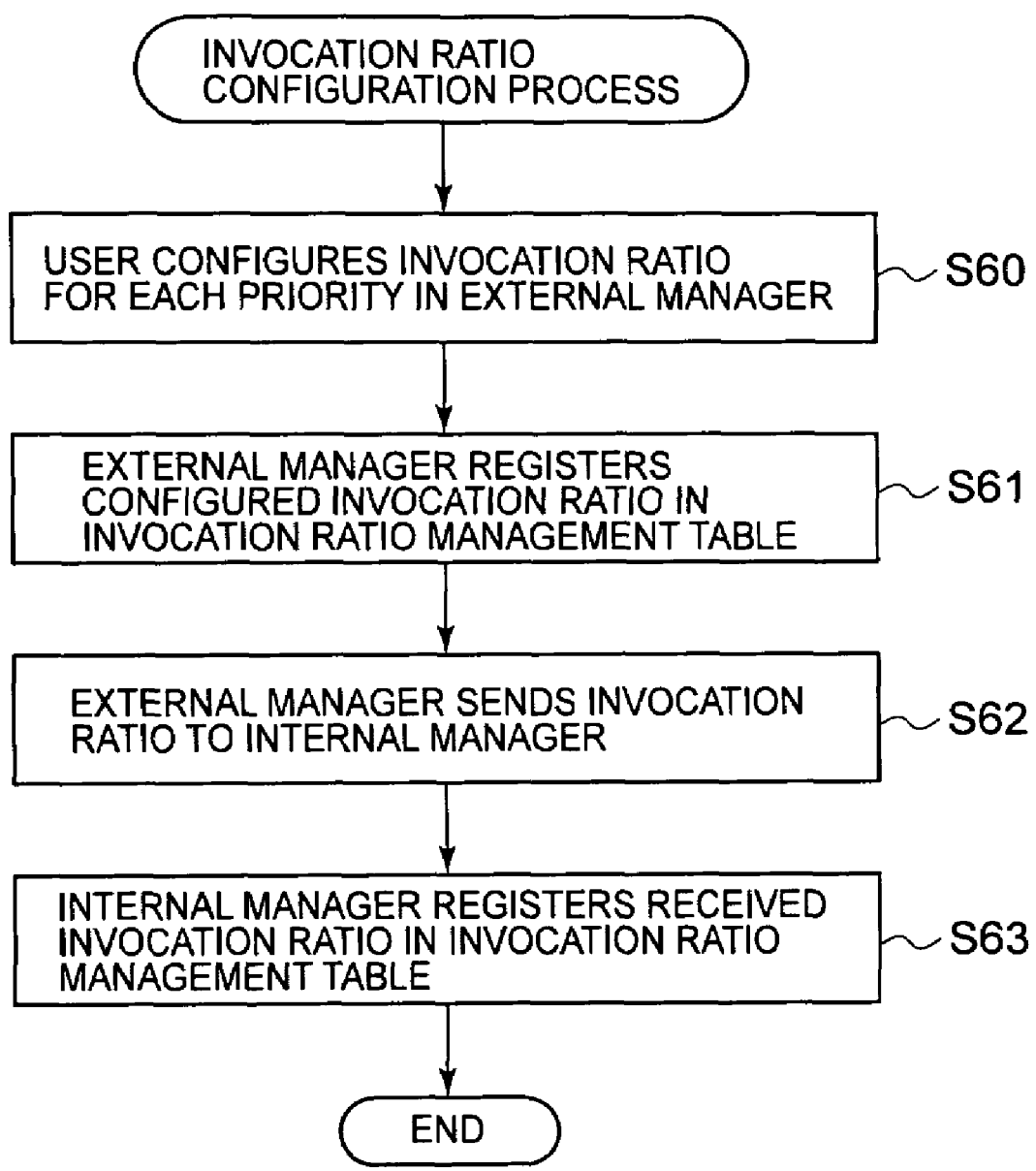
FIG. 12 is a flowchart of an invocation ratio configuration process.

FIG. 12 is a flowchart showing the process for respectively configuring invocation ratios by priorities. This process is executed in S30 of FIG. 9. First, the user configures an invocation ratio for each priority in the external manager 301 (S60).

The external manager 301 registers an invocation ratio configured by the user in the invocation ratio management table T31 (S61). Furthermore, the external manager 301 sends this invocation ratio to the internal manager 101 (S62). The internal manager 101 registers the invocation ratio received from the external manager 301 in the invocation ratio management table T11 (S63).

Figure 13:
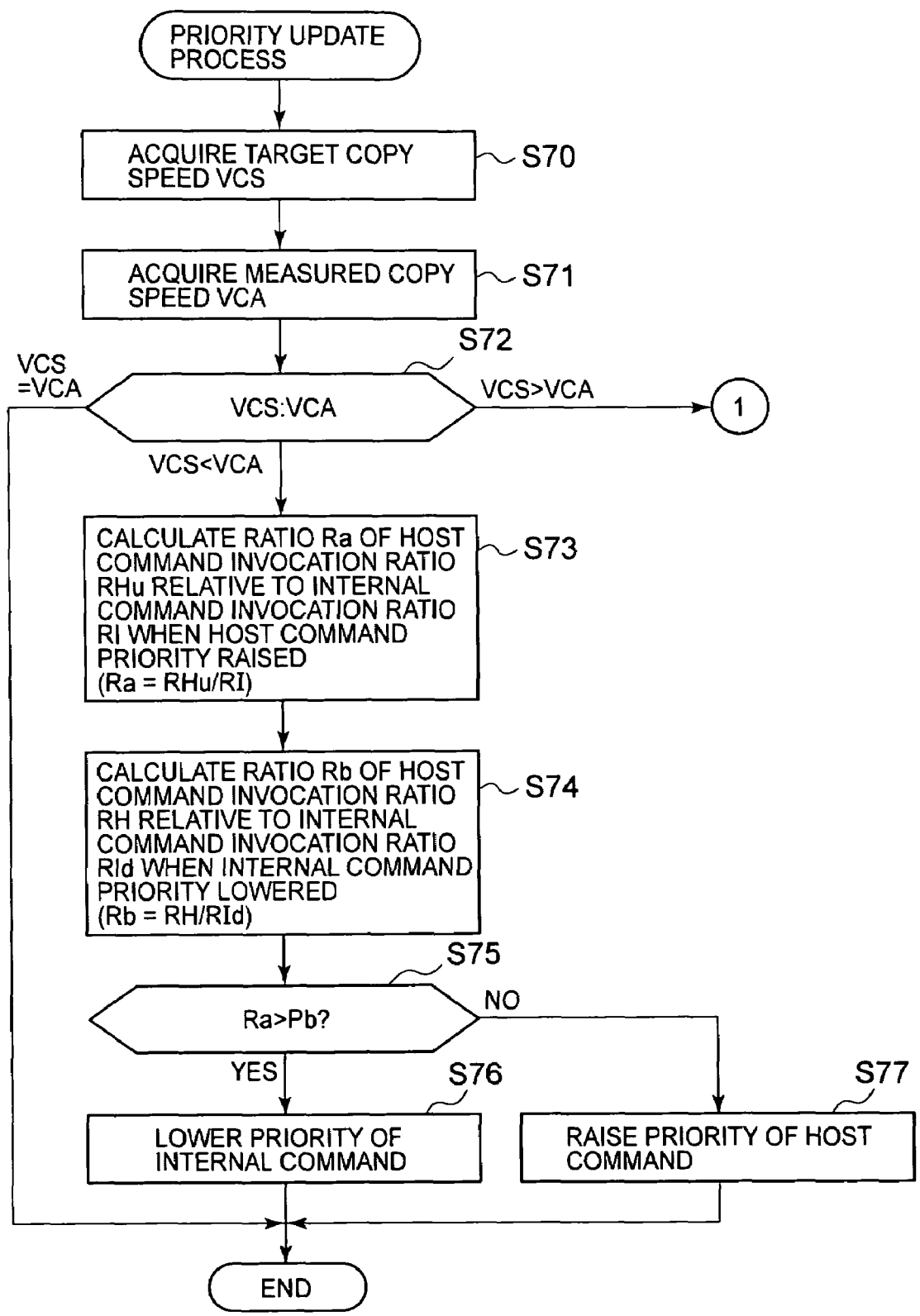
FIG. 13 is a flowchart of a priority update process.
Figure 14:
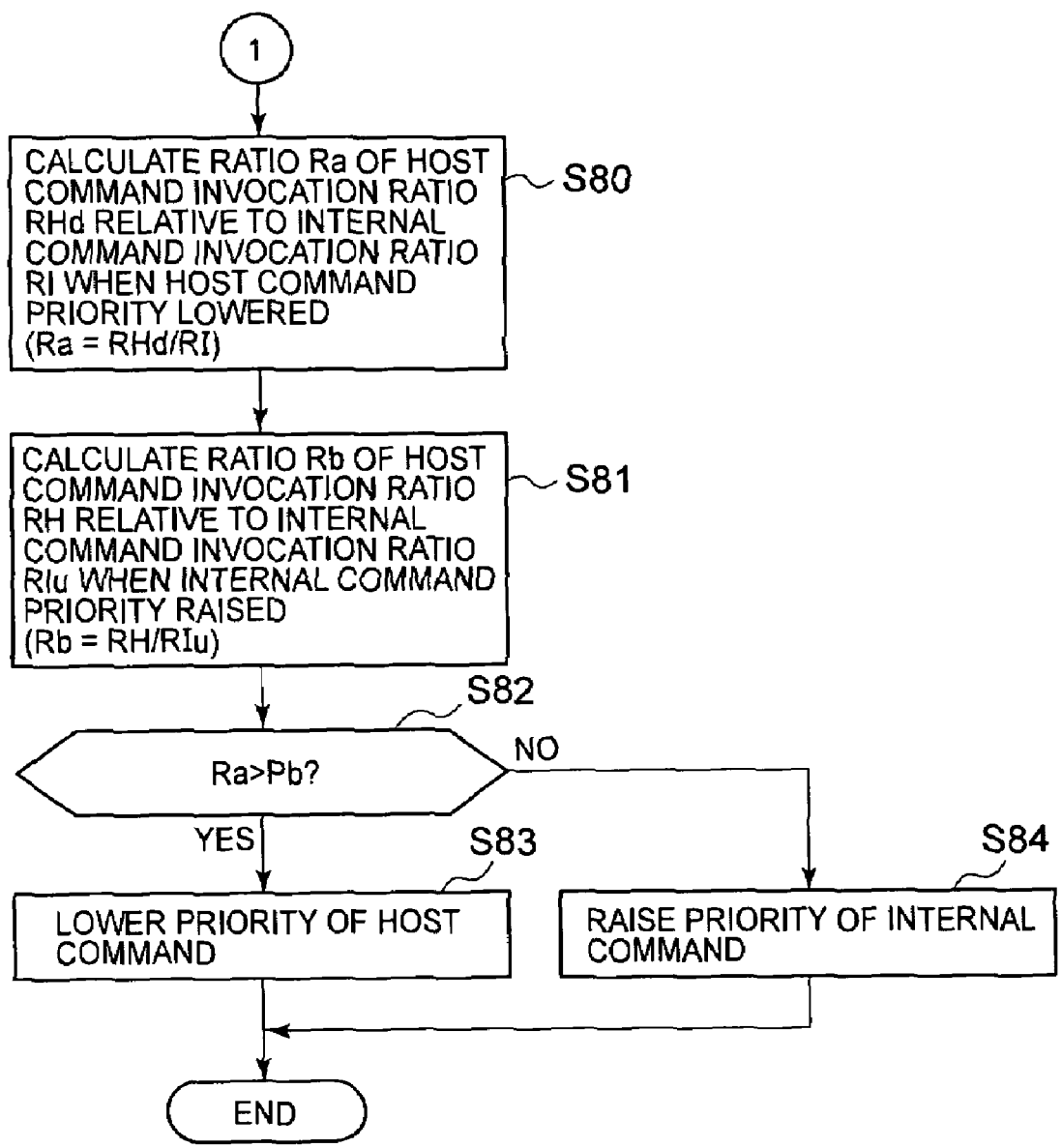
FIG. 14 is a continuation of the flowchart of FIG. 13.

FIGS. 13 and 14 are flowcharts of the priority update process shown in S36 of FIG. 9. In the priority update process, as will be described hereinbelow, the priority of either the host command or the internal command is either decreased or increased based on the difference between the target value and the measured value.

The internal manager 101 respectively acquires the target copy speed VCS and the measured copy speed VCA from the target value management table T12 (S70, S71). Hereinbelow, for convenience of explanation, the target copy speed VCS will be called the target value VCS, and the measured copy speed VCA will be called the measured value VCA.

Next, the internal manager 101 determines the size relationship between the target value VCS and the measured value VCA (S72). When the target value VCS and the measured value VCA match (VCS=VCA), this process ends. A case in which the target value VCS exceeds the measured value VCA (VCS>VCA), that is, a case in which the speed VCA of the copy process (either an initial copy or a backup copy) inside the storage is lower than the target value VCS will be explained hereinbelow using FIG. 14.

When the target value VCS is less than the measured value VCA (VCS<VCA), that is, when the actual copy speed VCA is greater than the target value VCS, either lowering the internal command priority or raising the host command priority is considered.

Accordingly, when the priority of the host command is raised, the internal manager 101 calculates the ratio Ra of the host command invocation ratio RHu relative to the internal command invocation ratio RI (Ra=RHu/RI) (S73).

Furthermore, when the priority of the internal command is lowered, the internal manager 101 calculates the ratio Rb of the host command invocation ratio RH relative to the internal command invocation ratio RId (Rb=RH/RId) (S74).

The internal manager 101 compares the Ra found in S73 and the Rb found in S74, and determines whether or not the Ra is larger than the Rb (S75). When the Ra is larger than the Rb (S75: YES), the internal manager 101 lowers the priority of the internal command (S76).

Ra>Rb is realized when the change Ra upon the host command priority being raised is larger than the change Rb upon the internal command priority being lowered. Therefore, the internal manager 101 lowers the internal command priority to reduce the fluctuation as much as possible (S76). Consequently, the invocation ratio RI of the internal command is lowered, making it possible to relatively lower the speed of the copy process executed between the storages 10, 20.

When the Ra is smaller than the Rb (S75: NO), the internal manager 101 increases the host command priority (S77). Consequently, the invocation ratio RH of the host command issued from the host 30 rises, making it possible to relatively lower the speed of the copy process executed between the storages 10, 20.

FIG. 14 shows a flowchart of a case in which the target value VCS exceeds the measured value VCA (VCS>VCA). When the measured value VCA of the copy process between the storages 10, 20 is lower than the target value VCS, this situation is dealt with by either lowering the priority of the host command or raising the priority of the internal command.

Accordingly, when the internal manager 101 decreases the priority of the host command, the internal manager 101 calculates the ratio Ra of the host command invocation ratio RHd relative to the internal command invocation ratio RI (Ra=RHd/RI) (S80).

Furthermore, when the internal manager 101 increases the internal command priority, the internal manager 101 calculates the ratio Rb of the host command invocation ratio RH relative to the internal command invocation ratio RIu (Ra=RH/RIu) (S81).

Similar to the description using FIG. 13, the internal manager 101 compares the Ra found in S80 and the Rb found in S81, and determines whether or not the Ra is larger than the Rb (S82). When the Ra is larger than the Rb (S82: YES), the internal manager 101 lowers the priority of the host command (S83).

Since the change Ra upon lowering the priority of the host command is greater that the change Rb upon raising the priority of the internal command, the internal manager 101 lowers the priority of the host command to reduce the fluctuation as much as possible (S83). Consequently, the host command invocation ratio RH is lowered, making it possible to relatively raise the speed of the copy process to be executed between the storages 10, 20.

When the Ra is smaller than the Rb (S82: NO), the internal manager 101 increases the priority of the internal command (S84). Consequently, it is possible to relatively raise the speed of the copy process to be executed between the storages 10, 20.

Figure 15:
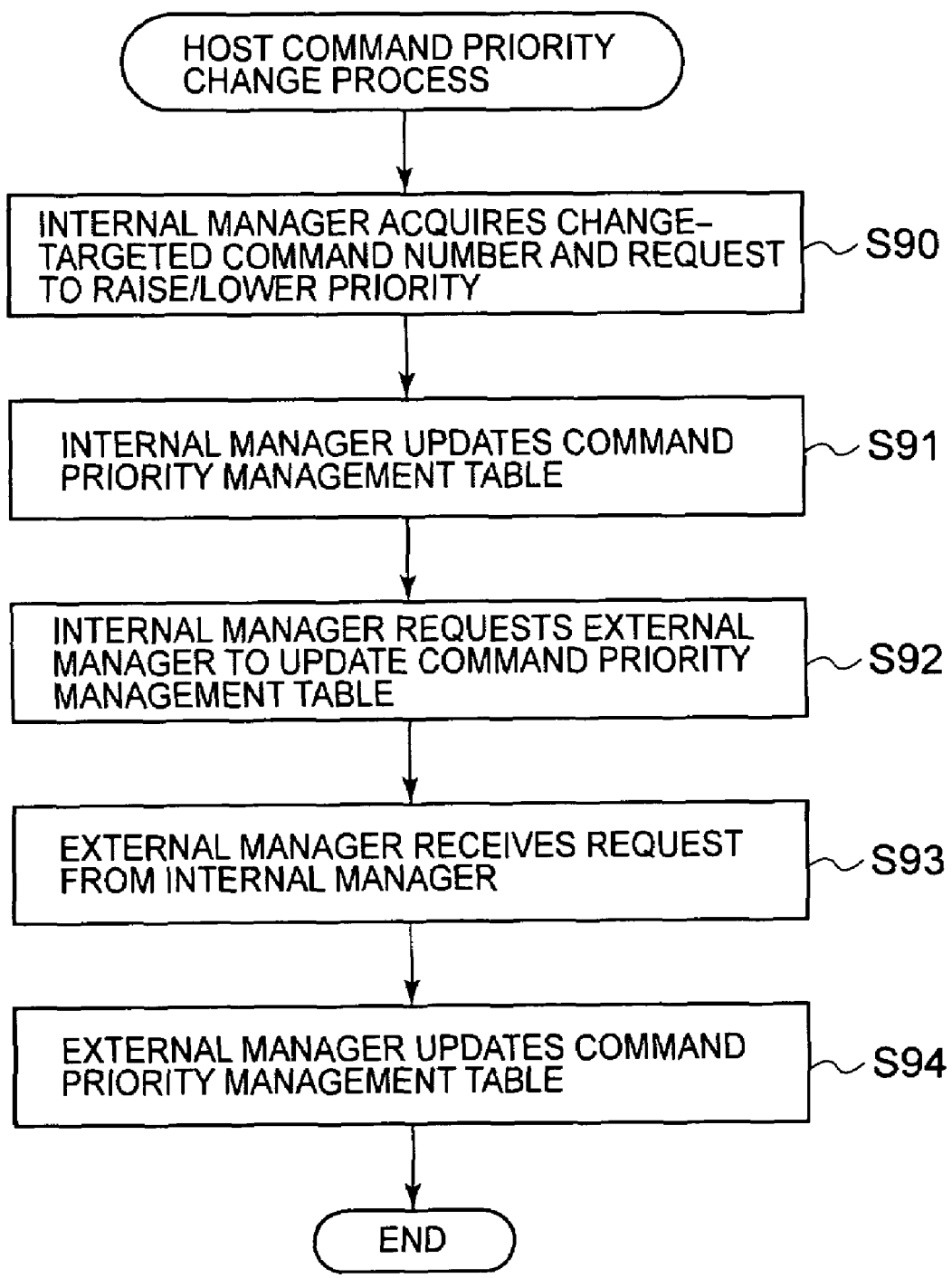
FIG. 15 a flowchart showing the process for changing the priority of a command.

FIG. 15 is a flowchart of a process that changes the priority of the host command. This process, for example, is executed when changing the priority of the host command in S77 of FIG. 13 and S83 of FIG. 14.

The internal manager 101 respectively acquires the number of the host command, which is the target of the priority change, and the request for either increasing or decreasing the priority (S90). That is, the internal manager 101 respectively acquires information for specifying the host command that is the priority change target, and information for specifying whether the priority of this host command should be increased or decreased (S90).

The internal manager 101 updates the command priority management table T10 based on the information acquired in S90 (S91). The internal manager 101 requests that the external manager 301 update the command priority management table T30 (S92). Upon receiving the request from the internal manager 101 (S93), the external manager 301 updates the command priority management table T30 (S94).

In this embodiment, the configuration value inputted by the user is transmitted to the internal manager 101 subsequent to being configured in the external manager 301. After control of the command invocation ratio has commenced, the internal manager 101 updates the management table T10 on the storage side, and thereafter transmits this update to the external manager 301.

Configuring this embodiment as described hereinabove makes it possible to linkedly operate the external manager 301 and the internal manager 101, thereby enabling the host command invocation ratio (execution frequency) and the internal command invocation ratio (execution frequency) to be adjusted automatically.

As a result of this, for example, it is possible to curb the lowering of host command-related response performance due to a process that is carried out in the background, such as an initial copy process, backup process, or data migration process, thereby making it possible to prevent a reduction in service quality and to improve usability.

In this embodiment, when the priority of the host command or the internal command is to be raised or lowered, the priority of whichever command will have the least amount of change is altered. That is, this embodiment changes the priority of the command for which a change in priority will have the smallest impact. Therefore, it is possible to change the invocation ratio in stages, making it possible to adjust a command invocation ratio more appropriately while maintaining the operational stability of the storages 10, 20.

Embodiment 2

A second embodiment will be explained by referring to FIGS. 16 and 17. The respective embodiments that follow, to include this embodiment, correspond to variations of the first embodiment. Hereinafter, explanations that duplicate those given with regard to the first embodiment will be omitted. In this embodiment, the logical volumes are divided into an internal volume 123 and an external volume 123V, and a priority is changed for each type of volume. For this reason, in this embodiment, the IOPS (Input Output Per Second) for each command is employed as the target value.

FIG. 16 is a schematic diagram showing an overview of a computer system according to this embodiment. An internal volume 123 and an external volume 123V are disposed in the first storage 10 of this embodiment. As described hereinabove, the external volume 123V is associated with the logical volume 223 inside the second storage 20 by way of the VDEV 122.

The host 30 can access both the internal volume 123 and the external volume 123V. The internal manager 101 monitors both a command related to the internal volume 123 and a command related to the external volume 123V.

Figure 17:
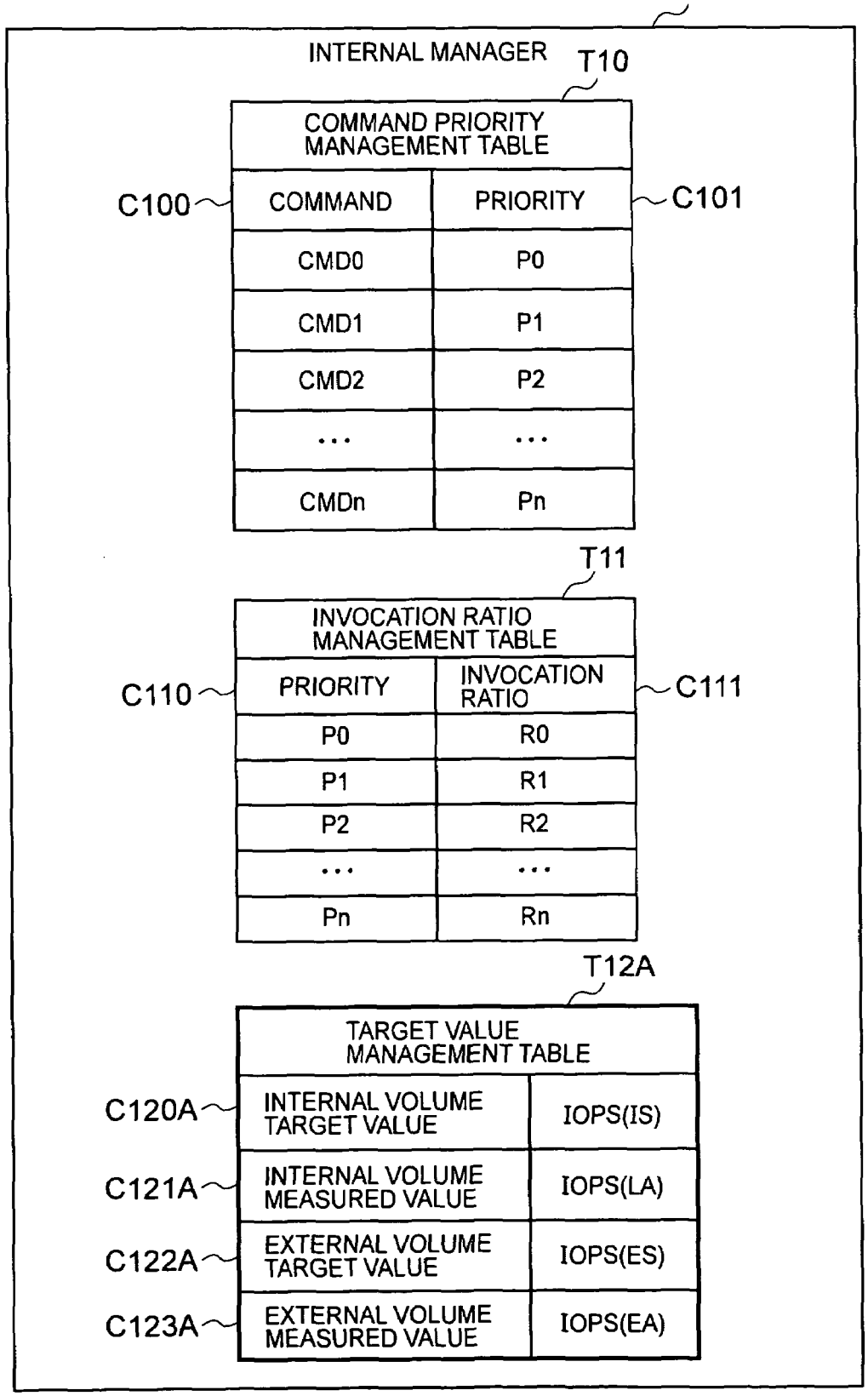
FIG. 17 is a schematic diagram showing the configuration of a table stored in the internal manager.

FIG. 17 shows a table used by the internal manager 101. A target value management table T12A of this embodiment configures a target value and a measured value using an IOPS value for both the internal volume 123 and the external volume 123V. That is, a target value IOPS (IS) and a measured value IOPS (IA) are configured for the internal volume 123, and a target value IOPS (ES) and a measured value IOPS (EA) are configured for the external volume 123V.

Configuring this embodiment like this also makes it possible to adjust invocation ratios between a plurality of types of commands the same as the first embodiment. That is, in this embodiment, the invocation ratio of a command related to the internal volume 123 and the invocation ratio of a command related to the external volume 123V can be adjusted in stages. For example, a command related to the internal volume 123 can be treated as the host command, and a command related to the external volume 123V can be treated as the internal command. Consequently, it is possible to control the invocation ratios between a plurality of types of commands using the methods described in the first embodiment.

Embodiment 3

FIG. 18 shows a priority management table T12B used in a computer system according to a third embodiment. In this embodiment, the ratios of the respective IOPS for each type of command are managed as target values.

In FIG. 18, the host command is shown as H-CMD, and the internal command is shown as I-CMD. (HS) denotes the configured value related to the host command, and (IS) denotes the configured value related to the internal command. (HA) denotes the measured value related to the host command, and (IA) denotes the measured value related to the internal command.

Configuring this embodiment like this makes it possible to automatically adjust the respective invocation ratios for each command, thereby enhancing usability.

Embodiment 4

Figure 19:
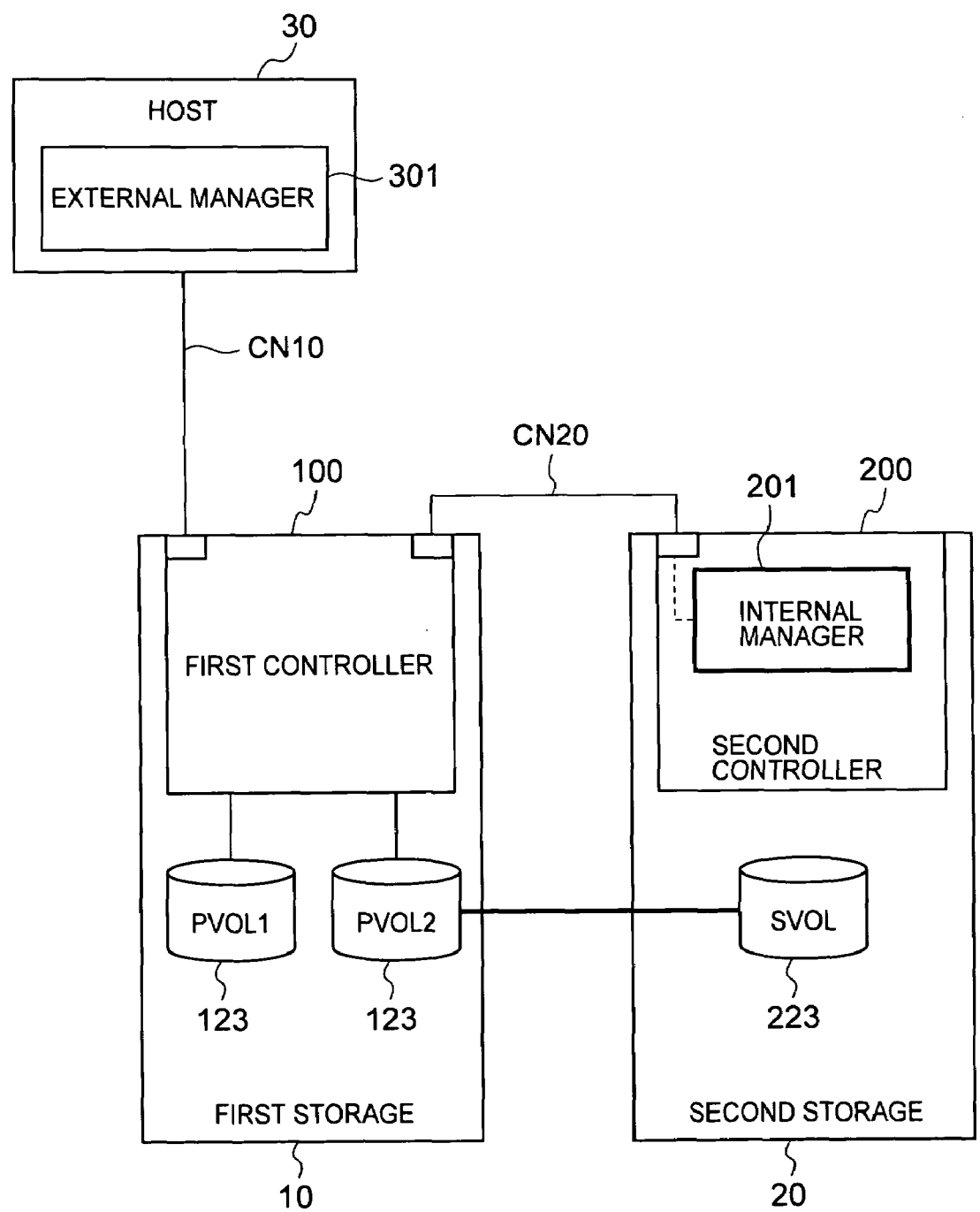
FIG. 19 is a schematic diagram showing an overview of a computer system related to a fourth embodiment.

A fourth embodiment will be explained based on FIGS. 19 through 21. In this embodiment, an internal manager 201 is disposed inside the second storage 20. FIG. 19 is a schematic diagram showing a computer system of this embodiment.

An internal manager is not disposed inside the first storage 10, but an internal manager 201 is disposed inside the second storage 20. The external manager 301 of the host 30 can communicate with the internal manager 201 via the first controller 100 of the first storage 10.

Figure 20:
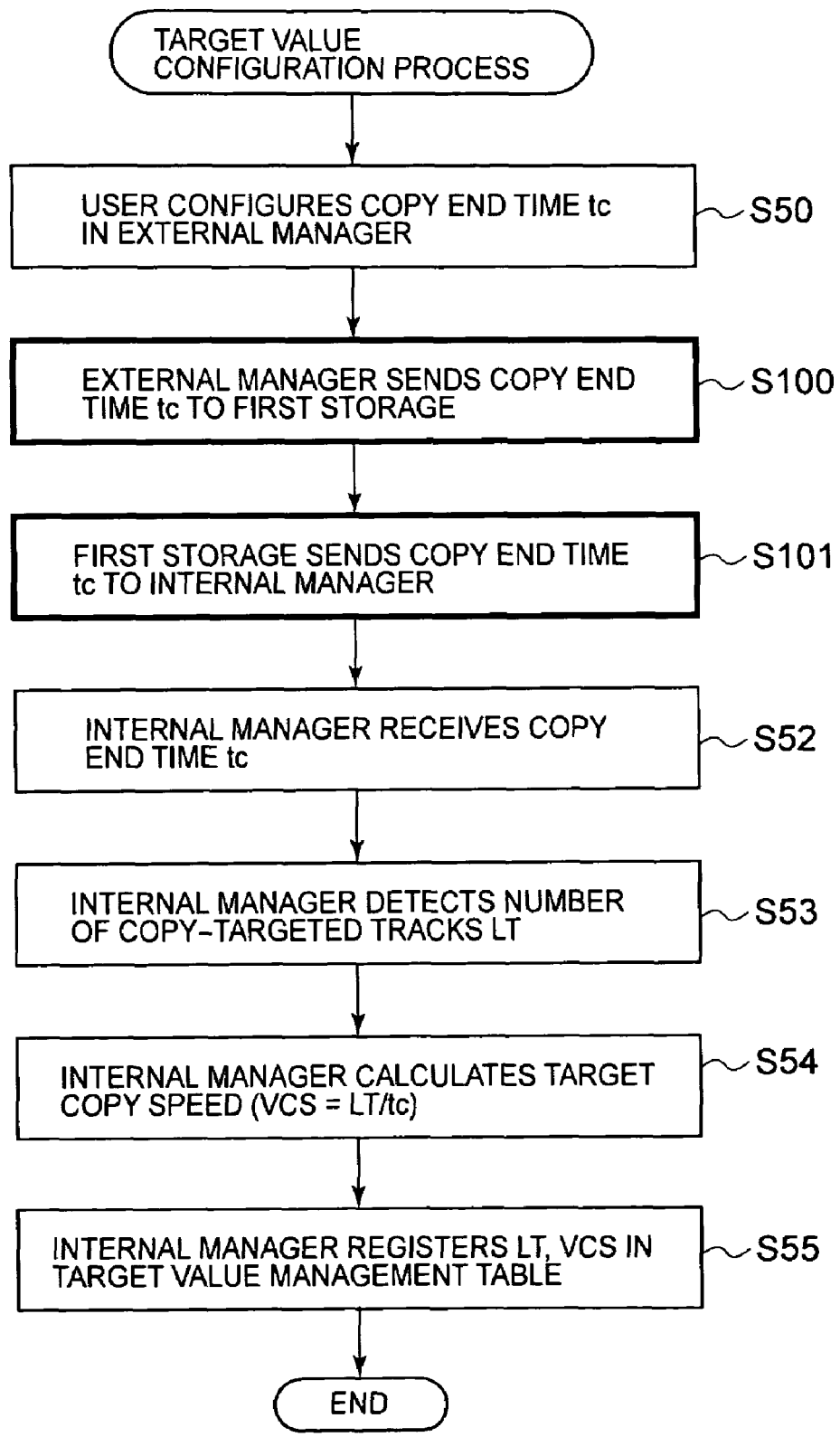
FIG. 20 is a flowchart of a target value configuration process.

FIG. 20 is a flowchart showing a target value configuration process. When the user configures the copy end time tc in the external manager 301 (S50), the external manager 301 sends the copy end time tc to the first controller 100 of the first storage 10 (S100).

The first controller 100 of the first storage 10 sends the copy end time tc to the internal manager 201 (S101). Hereinafter, the internal manager 201 creates a target value management table T12 as described using FIG. 11 (S52 through S55).

Figure 21:
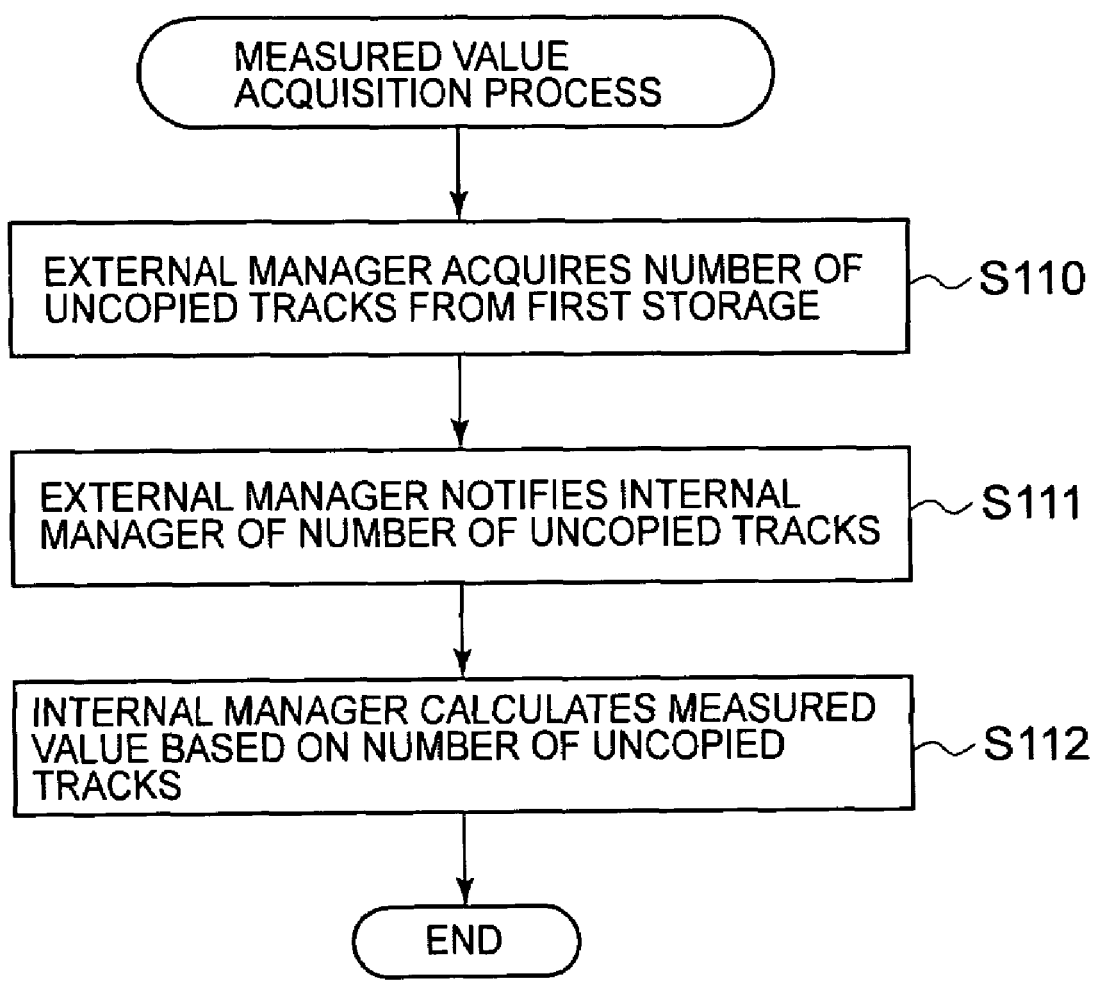
FIG. 21 is a flowchart of a measured value acquisition process.

FIG. 21 is a flowchart of a process in which the internal manager 201 acquires a measured value. The external manager 301 acquires the number of tracks that have not been copied yet from the first controller 100 of the first storage 10 (S110).

The external manager 301 notifies the internal manager 201 of the number of uncopied tracks by way of the first controller 100 (S111). The internal manager 201 calculates the measured value VCA based on the number of uncopied tracks (S112).

Configuring this embodiment like this exhibits the same effects as the first embodiment.

Embodiment 5

Figure 22:
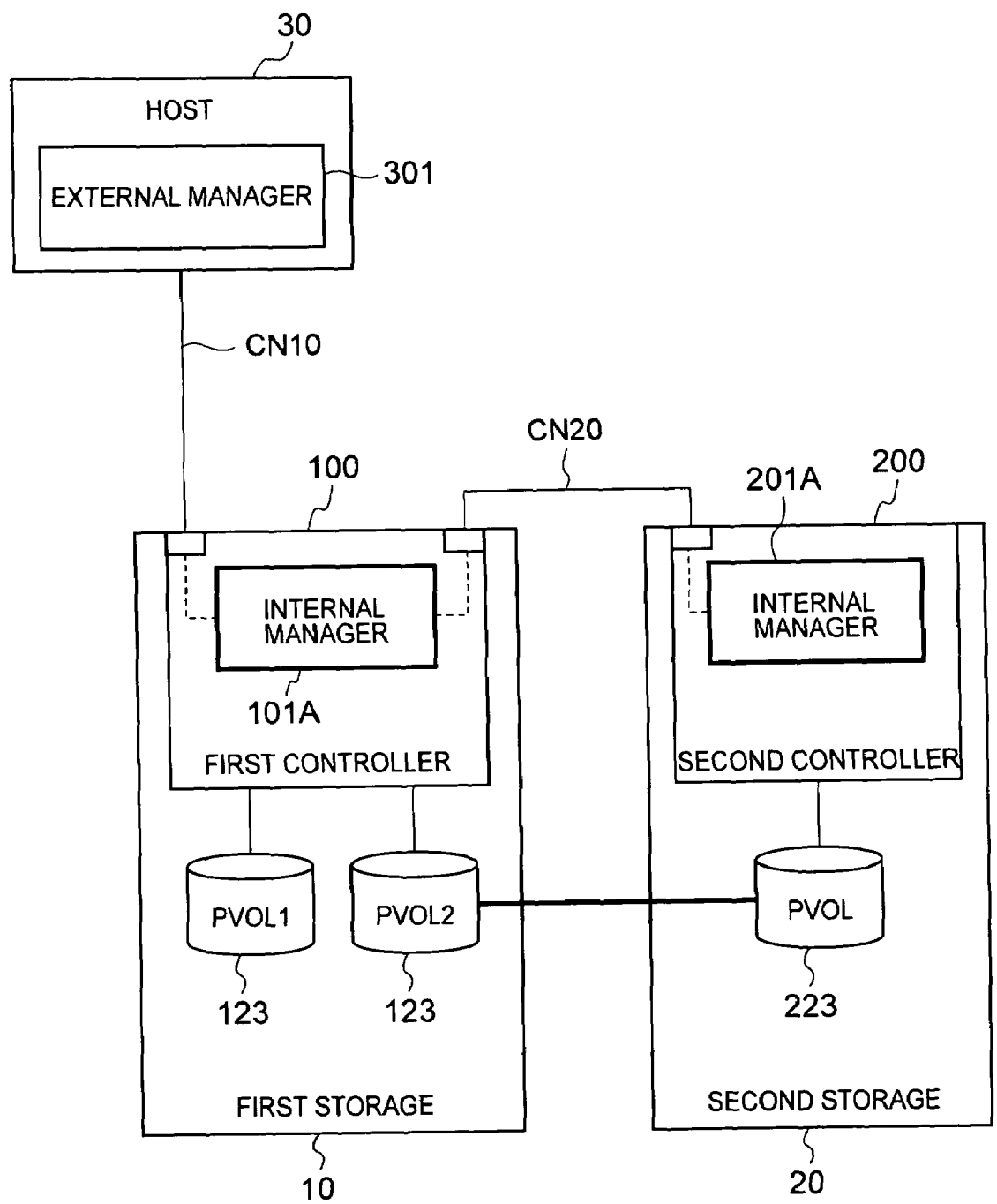
FIG. 22 is a schematic diagram showing an overview of a computer system related to a fifth embodiment.

FIG. 22 is a schematic diagram showing the entire configuration of a computer system according to a fifth embodiment. In this embodiment, a first internal manager 101A is disposed in the first storage 10 and a second internal manager 201A is disposed in the second storage 20.

The first internal manager 101A holds a command priority management table T10, and configures a priority for an internal command issued inside the first storage 10. The second internal manager 201A holds an invocation ratio management table T11, and schedules the invocations of respective commands in accordance with the invocation ratio.

Configuring this embodiment like this exhibits the same effects as the first embodiment. Furthermore, in this embodiment, the functions of the internal manager are distributively executed by a first internal manager 101A and a second internal manager 201A. Therefore, it is possible to reduce the load on the respective storages 10, 20.

Furthermore, the present invention is not limited to the respective embodiments described hereinabove. A person having ordinary skill in the art can make a variety of additions and changes without departing from the scope of the present invention.

What is claimed is:

1. A computer system having a host computer and a plurality of storage controllers used by the host computer, the computer system comprising:
   a first manager, disposed in the host computer, for associating a first priority with a first command issued from the host computer based on a first management table; and
   a second manager, disposed in at least any one prescribed storage controller of the plurality of storage controllers, for receiving both a second command issued from the prescribed storage controller and the first command issued from the host computer, the second manager (1) configuring a second priority for the second command based on a second management table, (2) respectively controlling an execution frequency of the first command and an execution frequency of the second command based on the first priority and the second priority, and (3) adjusting at least any one of the first priority and the second priority to make the execution frequency of a prescribed command of either the first command or the second command coincide with a preconfigured target value;
   wherein the first management table and the second management table respectively comprise a command priority management table in which priority values are respectively associated beforehand with each of the first command and the second command, and a priority invocation ratio management table in which an invocation ratio is associated beforehand with each of the priority values.

2. The computer system according to claim 1, wherein the first manager respectively configures the first management table and the second management table based on an indication from a user, and
   the second manager adjusts at least any one of the first priority and the second priority by respectively updating the contents of the first management table and the contents of the second management table based on a difference between the execution frequency and the target value of the prescribed command.

3. The computer system according to claim 1, wherein the second manager adjusts a value of the priority of any one of the first priority and the second priority so as to minimize a change in the execution frequency of the prescribed command.

4. The computer system according to claim 1, wherein the first manager can present the user with information related to the execution frequency of the prescribed command.

5. The computer system according claim 1, wherein the first manager acquires information related to the execution frequency of the prescribed command from the second manager, and presents the acquired information to the user.

6. The computer system according to claim 1, wherein the second command is processed by a plurality of storage controllers comprising the prescribed storage controller.

7. A command execution frequency control method for controlling a frequency at which a command issued from a host computer is executed inside a storage controller, and a frequency at which a command issued inside the storage controller is executed inside the storage controller, the control method comprising the steps of:

associating a first priority with a first command issued from the host computer based on a first management table;

associating a second priority with a second command issued from the storage controller based on a second management table;

receiving both the first command for which the first priority is configured and the second command for which the second priority is configured;

respectively controlling the first command execution frequency and the second command execution frequency based on the first priority and the second priority;

adjusting at least any one of the first priority and the second priority to make the execution frequency of a prescribed command of either the first command or the second command coincide with a preconfigured target value;

associating priority values in a command priority management table respectively beforehand with each of the first command and the second command, and a priority invocation ratio management table in which an invocation ratio is associated beforehand with each of the priority values, wherein the first management table and the second management table respectively comprise the command priority management table.

* * * * *